United States Patent
Ohgiichi et al.

(10) Patent No.: US 7,129,998 B2
(45) Date of Patent: Oct. 31, 2006

(54) LIQUID CRYSTAL DISPLAY DEVICE COMPRISING A PERIPHERAL AREA HAVING SIX SIGNAL LINE COMMON LINES EACH CONNECTED EVERY SIX SIGNAL LINES IN A DRIVER IC MOUNT REGION AND FOUR SCAN LINE COMMON LINES EACH CONNECTED TO EVERY FOUR SCAN LINES

(75) Inventors: Kimitoshi Ohgiichi, Mobara (JP); Ryouichi Ootsu, Mobara (JP); Kazushi Miyata, Mobara (JP); Shinichi Tsuruoka, Oohara (JP); Susumu Niwa, Chonan (JP)

(73) Assignees: Hitachi, Ltd., Tokyo (JP); Hitachi Device Engineering Co., Ltd., Hayano Mobara (JP)

( * ) Notice: Subject to any disclaimer, the term of this patent is extended or adjusted under 35 U.S.C. 154(b) by 0 days.

(21) Appl. No.: 10/863,501

(22) Filed: Jun. 9, 2004

(65) Prior Publication Data

US 2004/0233344 A1  Nov. 25, 2004

Related U.S. Application Data

(63) Continuation of application No. 09/798,948, filed on Mar. 6, 2001, now Pat. No. 6,750,926.

(30) Foreign Application Priority Data

Mar. 6, 2000  (JP) .............................. 2000-061197

(51) Int. Cl.
*G02F 1/1333* (2006.01)
(52) U.S. Cl. .................... 349/40; 349/151; 349/149
(58) Field of Classification Search ................ 349/40, 349/149–152, 192, 106
See application file for complete search history.

(56) References Cited

U.S. PATENT DOCUMENTS

| 5,657,139 | A | | 8/1997 | Hayashi |
| 6,043,971 | A | * | 3/2000 | Song et al. ................ 361/111 |
| 6,104,449 | A | * | 8/2000 | Takahashi et al. ........... 349/40 |
| 6,392,719 | B1 | * | 5/2002 | Kim ........................... 349/40 |

FOREIGN PATENT DOCUMENTS

| JP | 11-338376 | 12/1999 |
| JP | 2000-250071 | 9/2000 |

* cited by examiner

*Primary Examiner*—Dung T. Nguyen
*Assistant Examiner*—Thoi V. Duong
(74) *Attorney, Agent, or Firm*—Antonelli, Terry, Stout and Kraus, LLP.

(57) ABSTRACT

A display device having a substrate with a display area and a peripheral area being formed on the substrate. A plurality of signal lines and a plurality of scan lines are arranged in the display area. Six signal line common lines are provided in the peripheral area and at least one of two, three and four scan line common lines are provided in the peripheral area.

10 Claims, 30 Drawing Sheets

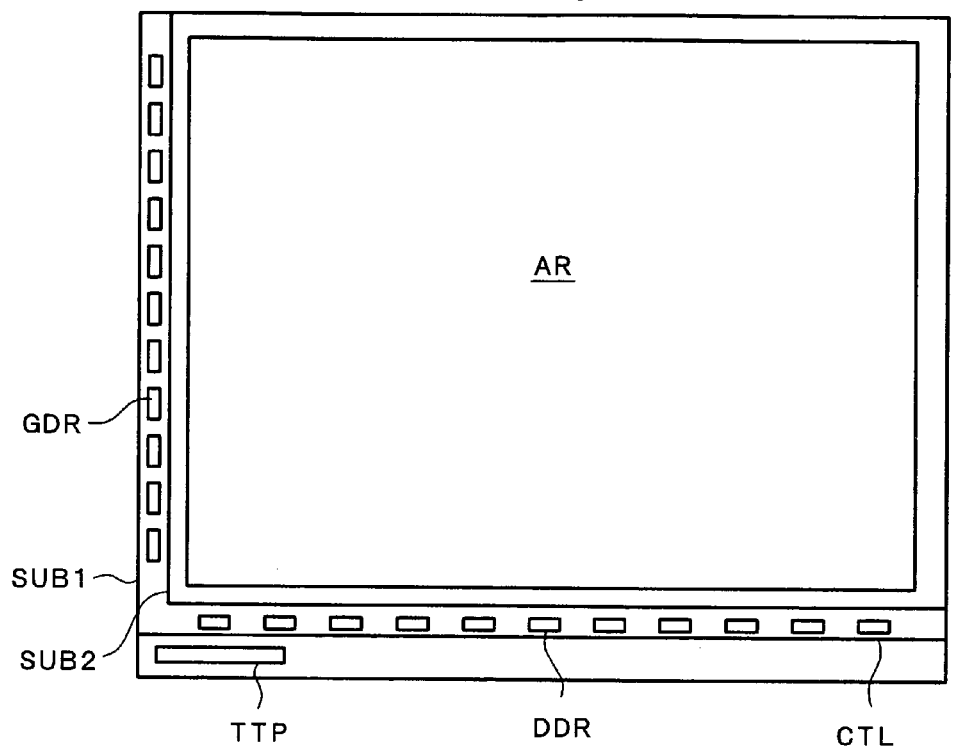
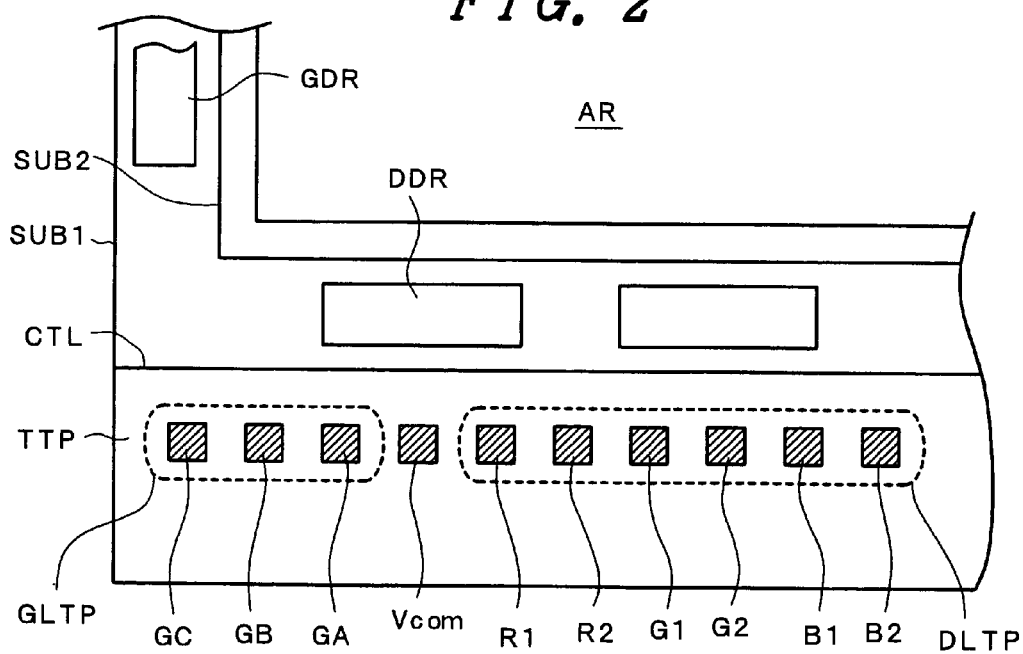

FIG. 8
Signal from CPU
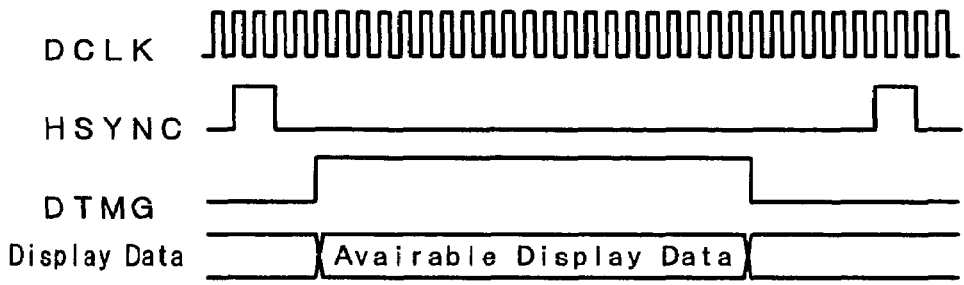
Output for DDR
Signal from CPU
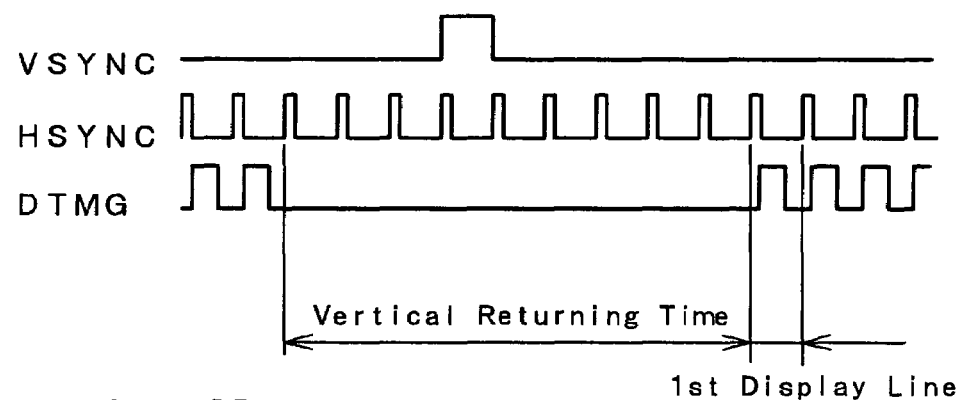
Output for GDR
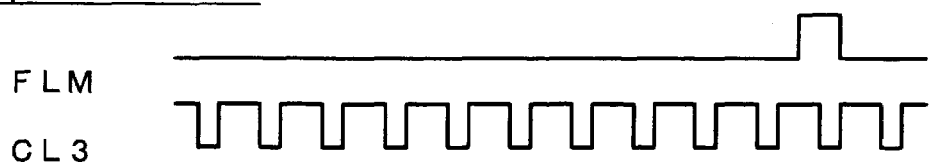

FIG. 11 (a) (PRIOR ART)
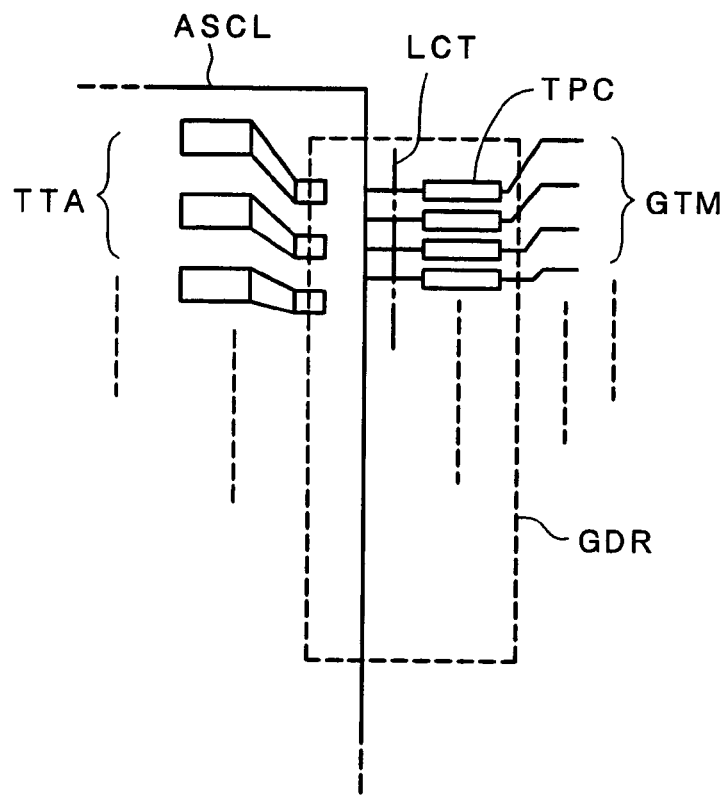
FIG. 11 (b) (PRIOR ART)
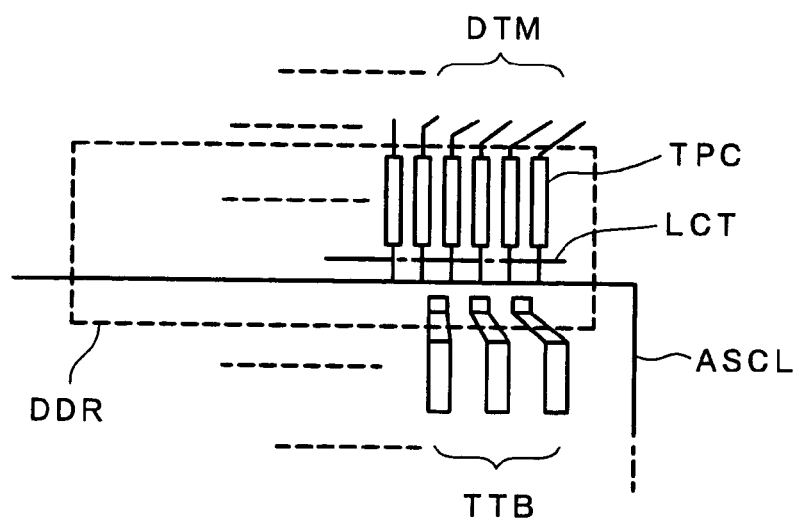

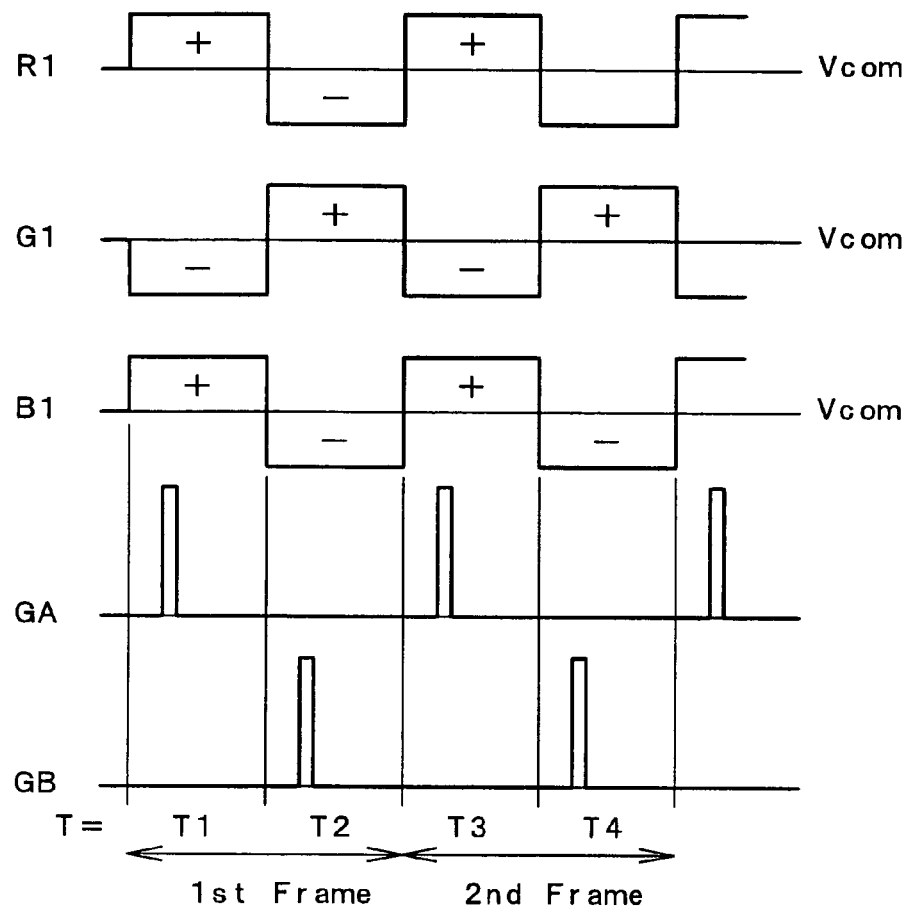

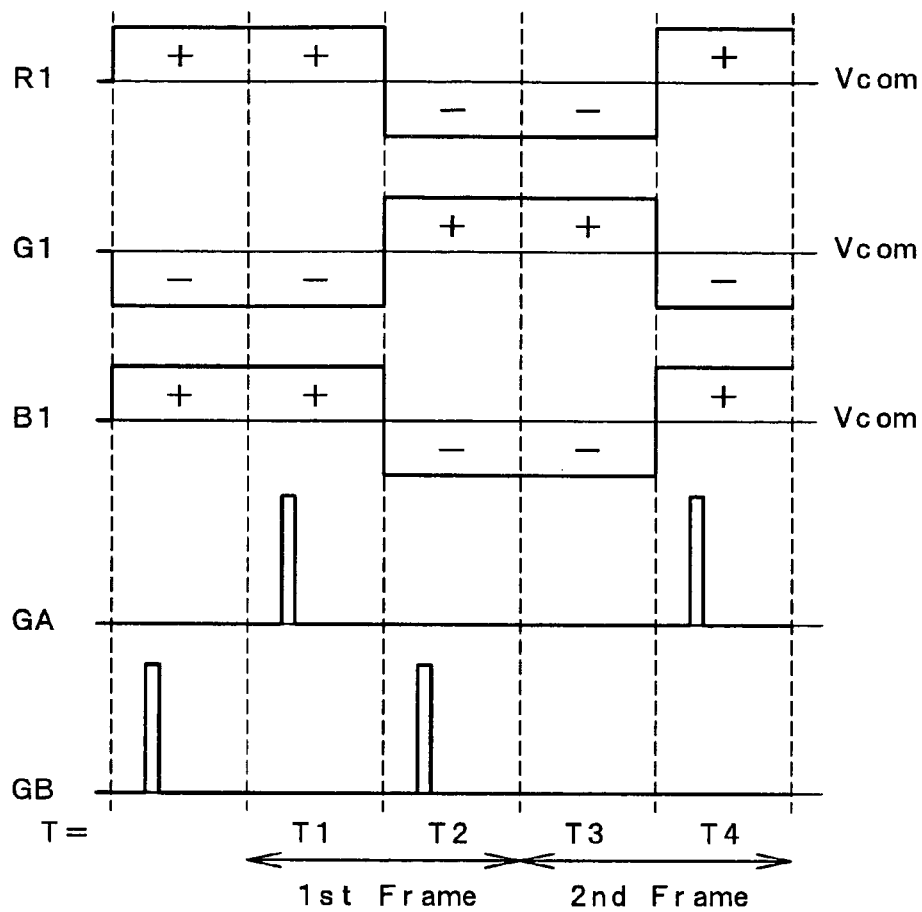

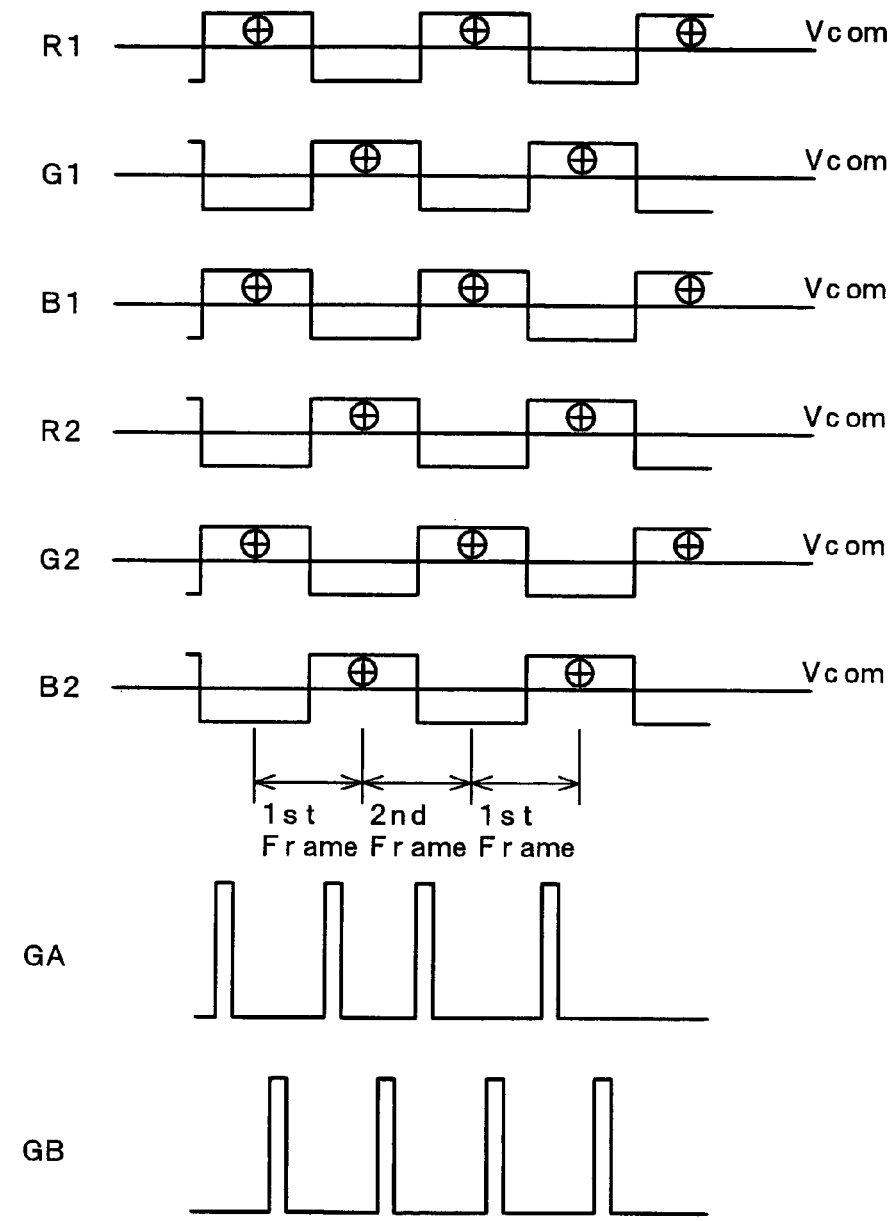

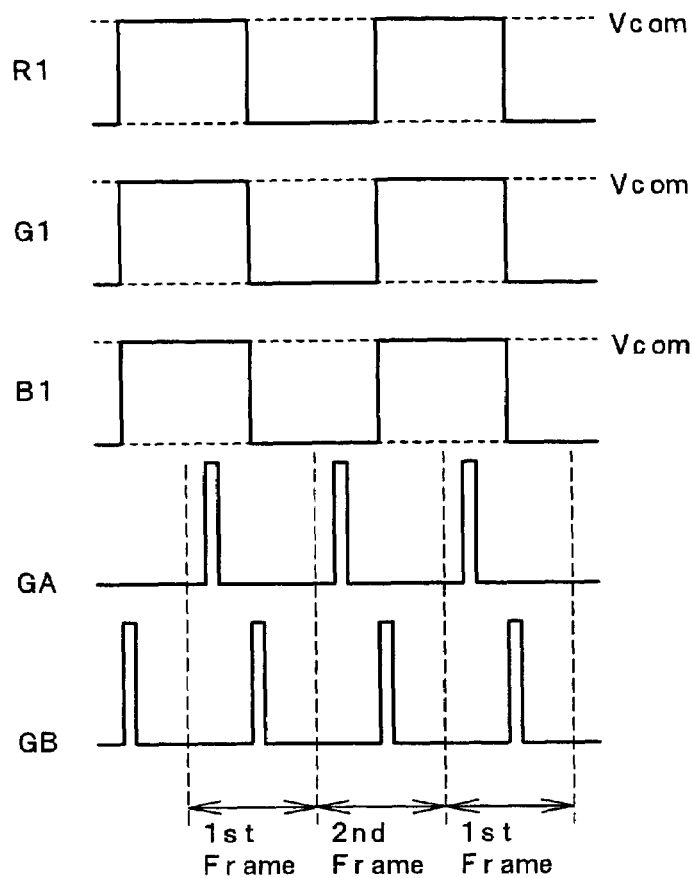

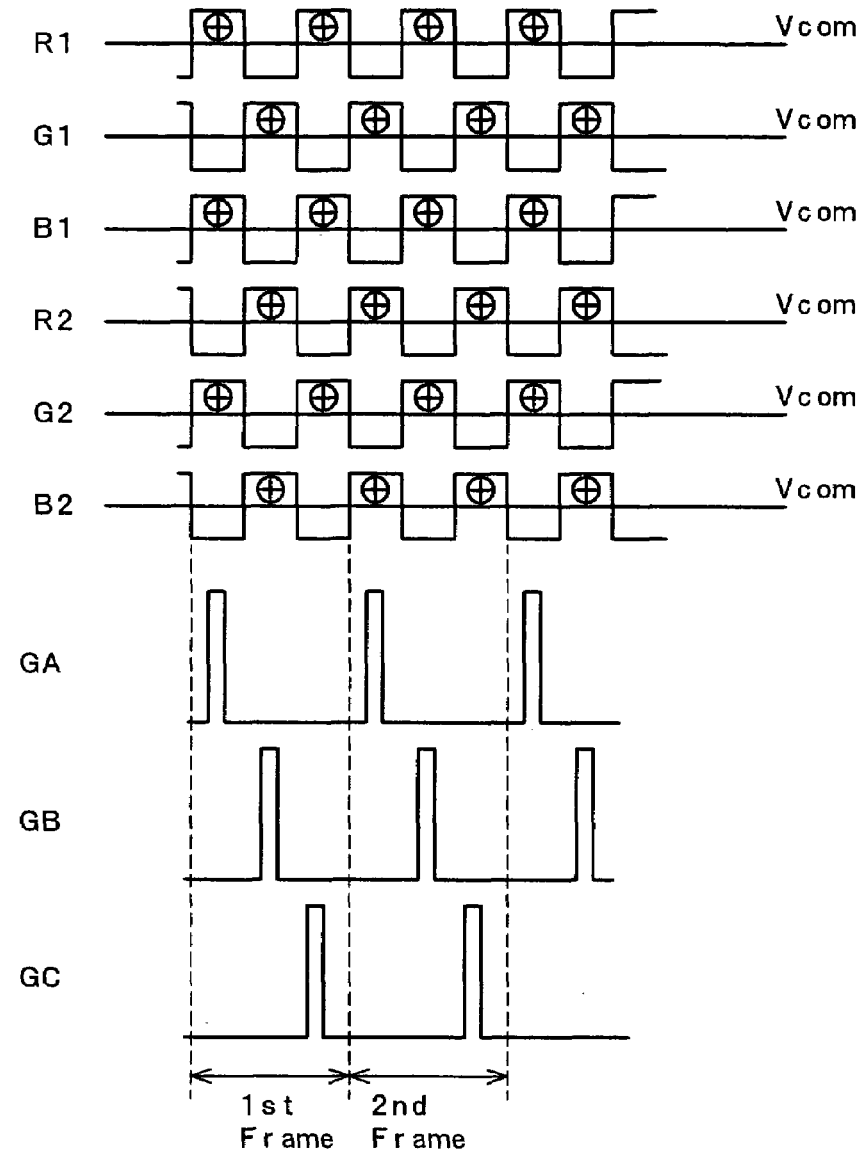

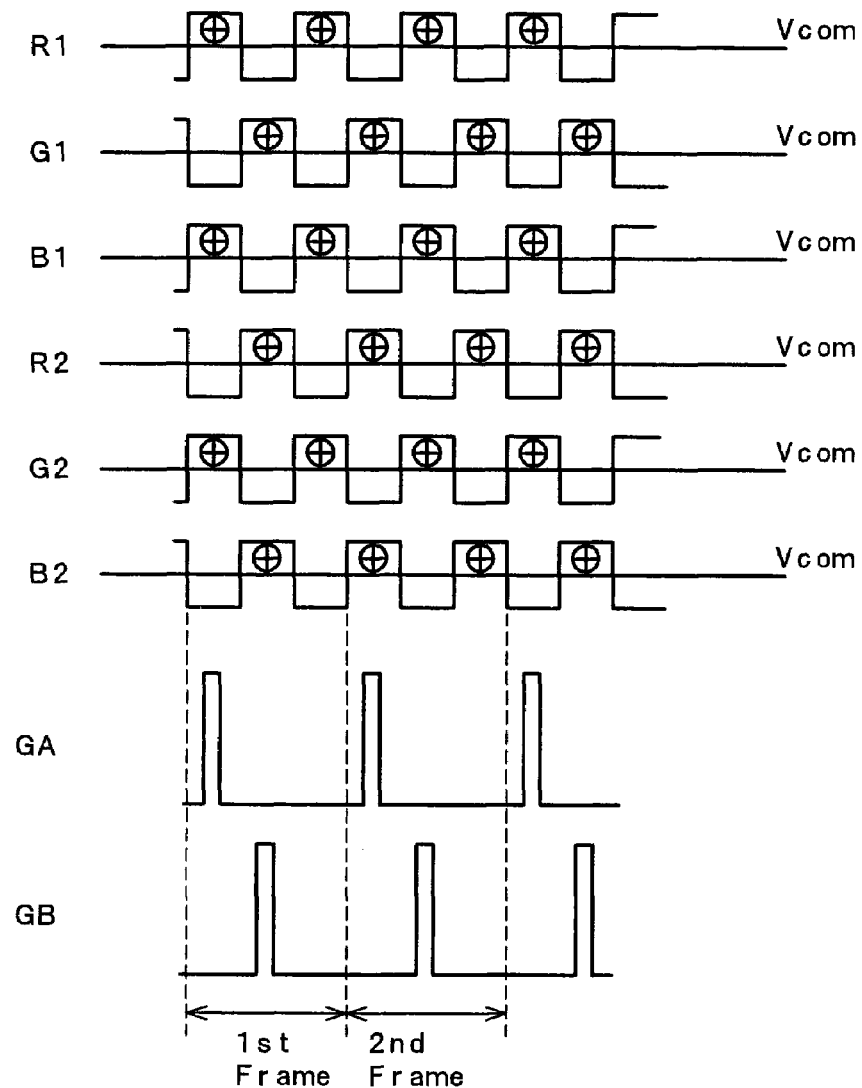

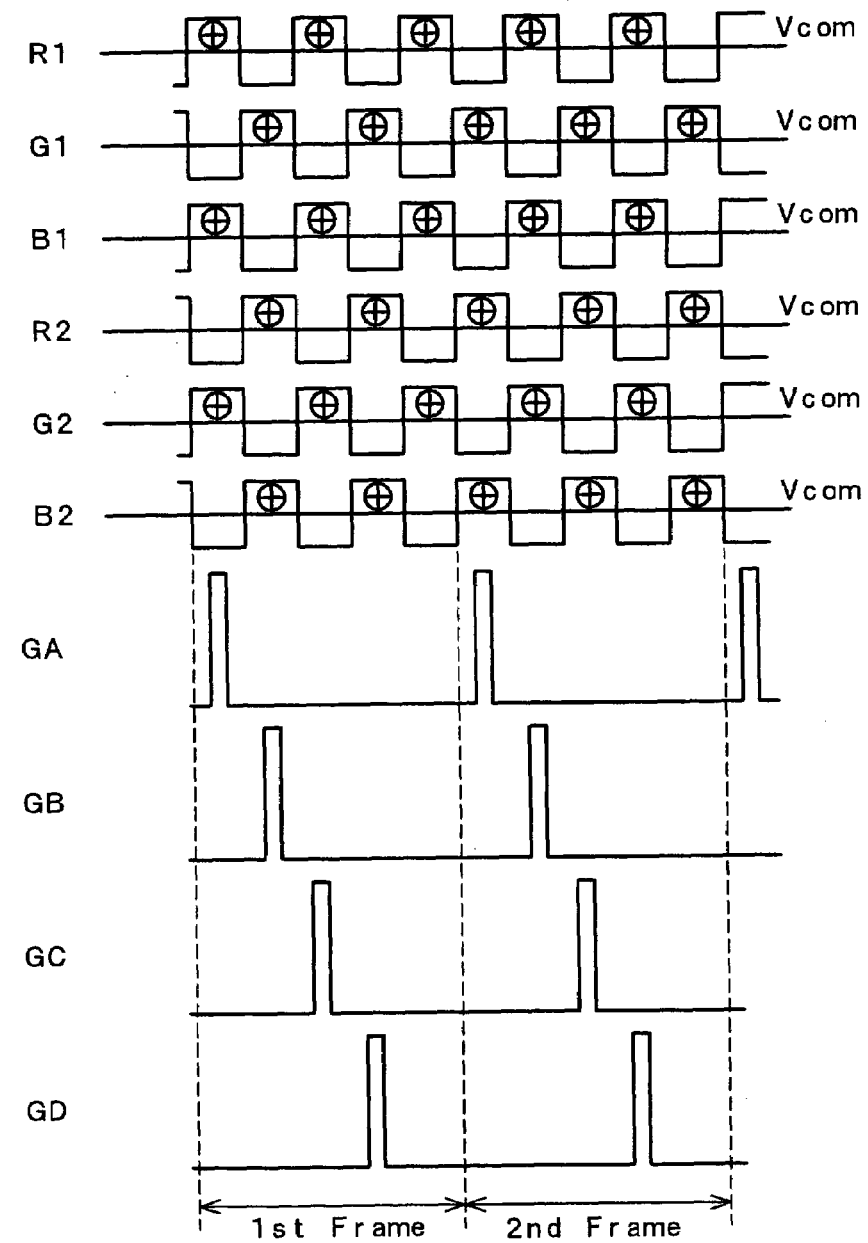

LIQUID CRYSTAL DISPLAY DEVICE COMPRISING A PERIPHERAL AREA HAVING SIX SIGNAL LINE COMMON LINES EACH CONNECTED EVERY SIX SIGNAL LINES IN A DRIVER IC MOUNT REGION AND FOUR SCAN LINE COMMON LINES EACH CONNECTED TO EVERY FOUR SCAN LINES

CROSS REFERENCE TO RELATED APPLICATION

This is a continuation of U.S. application Ser. No. 09/798,948, filed Mar. 6, 2001, now U.S. Pat. No. 6,750,926, the subject matter of which is incorporated by reference herein.

BACKGROUND OF THE INVENTION

The present invention relates generally to liquid crystal display devices; and, more particularly, the invention relates to liquid crystal display devices of the thin-film transistor type, in which test procedures are made easier for inspection of the functional operabilities of thin-film transistors and connection failures at scan line lead lines and/or signal line leads. This invention also relates to a method of manufacturing the same.

Liquid crystal display devices are widely employed as high-precision color display devices for use in notebook computers and display monitor units. Currently available liquid crystal display devices include those of the simple matrix type, which comprise a liquid crystal panel with a liquid crystal layer interposed between a pair of substrates, on the inside surfaces of which parallel electrodes are formed in such a manner as to cross over each other, and those of the active matrix type, which comprise a liquid crystal display element (referred to also as a liquid crystal panel hereinafter) having switching elements for selection of pixels disposed on one of a pair of substrates.

Active-matrix liquid crystal display devices include a liquid crystal display device of the so-called longitudinal electric field scheme, such as the twisted nematic (TN) type (generally called a TN type active-matrix liquid crystal display device), using a liquid crystal panel having a group of pixel selection electrodes formed on a respective one of a pair of upper and lower substrates, and a liquid crystal display device of the so-called lateral electric field type (generally known as an IPS type liquid crystal display device) using a liquid crystal panel with a pixel selection electrode group formed on only one of a pair of upper and lower substrates.

Typically, in Tn type of liquid crystal panel of an active-matrix liquid crystal display device, liquid crystals are aligned to twist by 90° within an interior space formed between a pair of substrates (two substrates consisting of a first substrate (lower substrate) and second substrate (upper substrate)), and two polarization plates are multilayered on the outside surfaces of the upper and lower substrates of such liquid crystal panel, respectively, with the absorption axis directions thereof being disposed in a cross polarization or "crossed Nicol" fashion and also with the light entrance side absorption axes being in parallel or at right angles to the rubbing direction.

In the TN type of active-matrix liquid crystal display device thus arranged, incident light becomes linearly polarized light at an incidence side polarization plate upon application of no voltages. This linear polarized light travels along the twisting paths of a liquid crystal layer; and, if the penetration axis of a light output side polarization plate is identical to the azimuth angle of the linear polarized light, then all rays of the linear polarized light are permitted to pass out, resulting in establishment of a white display (what is called the "normally open mode").

In the case of a voltage application, a unit vector's direction (director), indicating the average orientation direction of axes of the liquid crystal molecules constituting the liquid crystal layer, becomes perpendicular to the substrate surfaces, while the azimuth angle of incidence side linear polarized light remains unchanged, thus resulting in coincidence with the absorption axis of the light output side polarization plate, to thereby obtain a black display (see "Basics and Applications of Liquid Crystals," issued by Industry Research Association, 1991).

On the other hand, in an IPS type liquid crystal display device having pixel selection electrodes and electrode leads formed on only one of a pair of substrates for permitting switching of its liquid crystal layer in a specified direction extending in parallel to the substrate surfaces through voltage application between neighboring electrodes (between a pixel electrode and counter electrode) on this substrate, polarization plates are so disposed as to provide the black display when no voltages are applied thereto (the so-called "normally closed mode").

The IPS type liquid crystal display device's liquid crystal layer exhibits a homogeneous alignment or orientation parallel to the substrate surfaces in the initial state. Simultaneously the director of the liquid crystal layer in a plane parallel to the substrates is parallel or slightly angled relative to the electrode lead direction upon application of no voltages, causing the direction of the director of the liquid crystal layer in voltage application events to shift toward a direction perpendicular to the electrode lead direction upon application of a voltage thereto. When the liquid crystal layer's director direction is tilted toward the electrode lead direction by 45° in comparison with the director direction when no voltage are applied thereto, the liquid crystal layer, upon application of the voltage, causes the azimuth angle of polarized light to rotate 90° as in ½ wavelength plates resulting in coincidence between the light output side polarization plate's transmission axis and the polarized light's azimuth angle, thus providing a white display.

This IPS type liquid crystal display device has the characteristic feature that changes in color, phase and contrast remain low even at wide viewing angles, thus enabling achievement of wide view-field angles (see Japanese Patent Laid-Open No. 505247/1993).

A major approach to attain full color image visualization of the respective types of liquid crystal display devices stated supra is to employ a color filter scheme. This is achieved by subdividing a pixel corresponding to a single dot of color display into three portions and disposing color filters of the three primary colors, e.g. red (R), green (G) and blue (B), at such unit pixels, respectively.

Although the present invention is applicable to the various types of liquid crystal display devices stated above, its outline will be explained below with reference to a TN type active-matrix liquid crystal display device as an example.

As previously stated, in a liquid crystal element (liquid crystal panel) making up the TN type active-matrix liquid crystal display device (referred to simply as an active-matrix liquid crystal display device hereinafter for brevity purposes), there are formed on a liquid crystal layer side surface of one substrate of two transparent dielectric substrates, which are typically made of glass plates mutually opposed with a liquid crystal layer interposed therebetween, a group of scanning signal lines (referred to as gate lines hereinafter) extending in an "x" direction and being arranged in parallel in a "y" direction, and a group of drain lines (video signal lines) isolated from this gate line group and extending in the y direction, while being arranged in parallel in the x direction.

Each respective one of the regions surrounded by the gate line group and drain line group becomes a pixel region in which a thin-film transistor (TFT) for use as an active element (switching element) and a transparent pixel electrode are formed by way of example. When a scan signal is supplied to a gate line, the thin-film transistor turns on causing a video signal coming from a drain line to be supplied to the pixel electrode via this turned-on thin-film transistor.

Additionally, each drain line of the drain line group and each gate line of the gate line group are extended up to the periphery of the substrate to constitute external terminals, respectively, to which video drive circuits and gate scan drive circuits-namely a plurality of drive IC chips (semiconductor integrated circuits as will be referred to simply as drive ICs or ICs hereinafter) making up these circuits are connected, respectively, which are separately mounted at the substrate periphery. In other words, a plurality of tape carrier packages (TCPS) with these respective drive ICs mounted thereon are externally bonded to peripheral portions of the substrate.

However, since such a substrate is designed so that TCPs with drive ICs mounted are externally attached at the peripheral portions thereof, the occupation area of a region (generally called a "picture frame") defined between contour lines of a display region, as formed of the substrate's cross-over regions of the gate line group and drain line group, and an outer frame of the substrate becomes larger undesirably, which is conflicts with the demand for reducing or minimizing the outside dimensions of a liquid crystal display module with the liquid crystal display element and an illuminance light source (backlight unit) and other associative optical elements integrated therein.

Thus, in order to avoid this problem, or at least minimize risks involved, i.e. to fully meet demands for high-density mountability of the liquid crystal display element and also effect downsizing of the outer size of the liquid crystal display module, the so-called flip-chip scheme or alternative chip-on glass (COG) scheme has been proposed for permitting direct mounting of drive ICs for video driving and drive ICs for scan driving on one substrate (lower substrate) without the use of any TCP components. And, the drive ICs are designed to employ the so-called FCA scheme f or permitting electrodes formed on back surf aces of such drive ICs to be directly connected to electrical wiring leads formed on the substrate.

FIG. 10 is a perspective view illustrating a main part of a liquid crystal display device of the FCA mount type. This liquid crystal display device is arranged so that a liquid crystal layer is interposed between one substrate SUB1 with a matrix array of thin-film transistors formed thereon and an opposing substrate SUB2 with color filters formed thereon.

The one substrate SUB1 has one peripheral side along which scan line drive ICs (referred to as gate drivers hereafter) GDR are mounted by the FCA scheme. In addition, signal line drive circuit ICs (drain drivers) DDR are similarly mounted by the FCA scheme along another side of the substrate.

Outputs of the gate drivers GDR are connected to scan line extension leads GTM, whereas inputs thereof are connected to wiring lines of a flexible printed circuit board FPC1. Outputs of the drain drivers DDR are connected to signal line leads DTM, while their inputs are coupled to wiring lines of a flexible printed circuit board FPC2.

As shown by arrows in FIG. 10, the flexible printed circuit boards FPC1, FPC2 are arranged such that the flexible printed circuit board FPCI can be bent in a direction BENT1 toward the back surface of substrate SUB1; and then, a curvature portion JT2 of the flexible printed circuit board FPC2 can be folded along a fold line BTL in the BENT2 direction and then folded in a direction BENT3 for accordion-like folding onto the back surface of flexible printed circuit board FPC1.

Under this condition, the flexible printed circuit board FPC2's connector CT4 can be connected to a connector, not shown, as provided on the flexible printed circuit board FPC1. An adhesive tape BAT is interposed on the inner surface of the folded portion of the flexible printed circuit board FPC2, resulting in fixture of flexible printed circuit board FPC2.

Note here that reference characters "CHG" and "CHD" designate electronics components, such as capacitors and others; ALMG, ALMD denote alignment marks; POL2 denotes a polarization plate; and AR denotes a display region.

In the liquid crystal display device with the above arrangement, probes of test/inspection equipment may be attached to extension leads of the gate lines and extension leads of the drain lines, which are extended from the thin-film transistors formed on one substrate SUB1, to thereby perform several tests for inspection of thin-film transistor characteristics and connection failures at respective electrical leads and turn-on or "lighting" tests after adhesion with the other substrate.

FIGS. 11(a) and 11(b) are diagrams of test terminals in one prior art type of liquid crystal display device, wherein FIG. 11(a) is a pictorial representation of the gate driver side, whereas FIG. 11(b) depicts the drain driver side.

In FIG. 11(a), GTM designates gate line extension leads; TPC denotes test terminals; GDR indicates gate driver mount portions (shown by dot lines); LCT denotes a laser cut line; ASCL denotes a gate line side static electricity suppression common line; GTM denotes input terminals of the gate drivers GDR.

In the manufacture of one substrate SUB1 (thin-film transistor substrate), the gate line extension leads GTM are short-circuited by the static electricity suppression common line ASCL for protection against damage to thin-film transistors and wiring leads occurring due to invasion of static electricity. Thereafter, the gate line leads GTM and individually cut along the laser cut line LCT; and then, the probes are attached to the test terminals TPC for inspection to detect connection failure or unwanted open-circuiting, while performing lighting tests upon application of more than one signal thereto.

In FIG. 11(b), DTM designates drain line extension lines; TPC denotes test terminals; DDR indicates drain driver mount portions (shown by dot lines); LCT denotes a laser cut line; ASCL denotes a drain line side static electricity suppression common line; and TTB denotes input terminals of the gate drivers GDR.

Similarly, on the drain driver side also, in the manufacture of such a substrate, the drain line extension leads DTM are short-circuited by the static electricity suppression common line ASCL for preclusion of damage due to invasion of static electricity at the thin-film transistors and wiring leads concerned. Thereafter, the drain line leads DTM are individually cut along the laser cut line LCT; and then, all the probes are attached to the test terminals TPC at a time for open-circuit inspection while performing lighting tests upon application of a signal (s) thereto.

An example of this flip-chip scheme liquid crystal display device is disclosed in Japanese Patent Laid-Open No. 122806/1996.

SUMMARY OF THE INVENTION

In the prior art test terminal layout, the requisite number of gate drivers and drain drivers-in particular drain drivers-increases with growth in high-precision displayability, resulting in a decrease in pitch of the output terminals thereof (pitches of GTM and DTM of FIG. 11(a) and FIG. 11(b)).

As a result, it becomes impossible to provide the test terminals (TPC of FIGS. 11(a) and 11(b)) with sufficiently large widths and lengths, which in turn makes it difficult to achieve simultaneous contacting of all probes as in the prior art, leading to occurrence of a problem of decreased inspection accuracy due to probe deviation during open-circuit and lighting tests, while externally applying test voltages to the test terminals involved. In addition, production of probes to be applied to output terminals having such narrow pitches is also becoming more difficult.

An object of the present invention is to avoid the problems faced by the prior art to thereby provide a liquid crystal display device having a wiring lead structure which makes it possible to perform a variety of different kinds of tests with simultaneous contact of probes to all terminals at one time, and which also enables the use of a test/inspection apparatus having probes with a common applicability for multiple types of products by standardization of a pattern of test terminals.

Another object of this invention is to provide a liquid crystal display device which is capable of facilitating production of the probes at low costs and a method of manufacturing the device.

A further object of the invention is to provide a liquid crystal display device similar to that stated above and which is capable of suppressing reduction of the capability for detection of display defects during inspection, and a manufacturing method thereof.

To attain the foregoing objects, the present invention provides as its representative means a technique for subdividing output terminals (lead lines) of drain drivers into six separate groups with regard to the three primary colors of red, green and blue, which groups include a positive polarity of red, negative polarity of red, positive polarity of green, negative polarity of green, positive polarity of blue, and negative polarity of blue; wherein, respective groups are bundled and connected together to drain line common lines, which are taken out of a drain driver mount region for permitting execution of inspection, while permitting probes be attached to test terminals, as provided at the drain line common lines.

In addition, regarding the gate driver side, a technique is provided as a representative means for classifying output terminals (lead lines) of gate drivers into three groups, including a front stage, a next stage and a rear stage, or alternatively four groups for setting polarities so as to be reversed in units of respective dots; wherein, respective groups are bundled and connected together to gate line common lines, which are taken out of a gate driver mount region for permitting execution of inspection, while permitting probes to be attached to test terminals, as provided at the gate line common lines.

Some representative arrangements in accordance with the present invention will be set forth below.

(1) A liquid crystal display device has a pair of substrates with a liquid crystal layer interposed therebetween, one of said substrates having thereon a matrix array of thin-film transistors, pixel electrodes driven by the thin-film transistors, and a pattern of scanning lines and signal lines for supplying the thin-film transistors with voltage signals used for pixel formation, a remaining one of said substrates having color filters of the three colors of red and green and blue, the one substrate also having a peripheral side at which scan line lead terminals are provided and another peripheral side at which signal line lead terminals are provided; a scan line drive IC mount region and signal line drive IC mount region having output terminals connected to respective ones of said scan line lead terminals and said signal line lead terminals of the liquid crystal panel, while permitting direct mounting of more than one scan line drive IC and more than one signal drive IC, respectively; and more than one static electricity suppression common line provided in a cut removal region for commonly connecting said scan line lead terminals and signal line lead terminals together.

The device is specifically arranged to comprise: six signal line side common lines provided in the signal line drive IC mount region of the signal line lead terminals connected to said static electricity suppression common line, for connection with six terminal groups which are divided from the signal line lead terminals in a way such that the groups are of positive polarity of red, negative polarity of red, positive polarity of green, negative polarity of green, positive polarity of blue, and negative polarity of blue; and test pads provided on said one substrate in an area excluding said signal line drive IC mount region f or connection to said six signal line side common lines.

With such an arrangement, it is possible to enlarge the width and length plus the pitch of test pads for connection to the signal line leads, thus making it possible to simplify the production of the probes, resulting in an increase in contact accuracy.

(2) The test pads of said six signal line side common lines are disposed in the cut removal region of said one substrate.

It is possible to standardize patterns of the test pads, thereby enabling the intended inspection of liquid crystal display devices of multiple types of products to be carried out by use of a test apparatus or equipment having a common probe or probes.

(3) A liquid crystal display device has a pair of substrates with a liquid crystal layer interposed therebetween, one of said substrates having thereon a matrix array of thin-film transistors, pixel electrodes driven by the thin-film transistors, and a pattern of scanning lines and signal lines for supplying the thin-film transistors with voltage signals used for pixel formation, a remaining one of said substrates having color filters of the three colors of red and green and blue, the one substrate also having a peripheral side at which scan line lead terminals are provided and another peripheral side at which signal line lead terminals are provided; a scan line drive IC mount region and signal line drive IC mount region having output terminals connected to respective ones of said scan line lead terminals and said signal line lead terminals of the liquid crystal panel, while permitting direct mounting of more than one scan line drive IC and more than one signal drive IC, respectively; and more than one static electricity suppression common line provided in a cut removal region for commonly connecting said scan line lead terminals and signal line lead terminals together.

The device comprises three scan line side common lines provided in the scan line drive IC mount region of the scan line lead terminals, which are connected to the static electricity suppression common line, for connection with three groups being divided from the scan signal line lead terminals and having a front stage and a next stage plus a rear stage, or alternatively four terminal groups divided therefrom, in order to allow the polarity become reversed in units of dots; six signal line side common lines provided in the signal line drive IC mount region of the signal line lead terminals connected to said static electricity suppression common line, for connection with six terminal groups which are divided from the signal line lead terminals in a way such that the groups are of positive polarity of red, negative polarity of red, positive polarity of green, negative polarity of green, positive polarity of blue, and negative polarity of blue; and test pads provided on said one substrate in an area excluding said scan line drive IC mount region and said signal line drive IC mount region for being associated with said three or four scan line side common lines and said six signal line side common lines, respectively.

With this arrangement, it is possible to enlarge the width and length plus the pitch of test pads for connection to the signal line leads, thus making it possible to simplify the production of the probes, resulting in an increase in contact accuracy.

(4) The test pads of the three or four scan line side common lines and the six signal line side common lines are disposed in the cut removal region of said one substrate.

(5) The test pads of the three or four scan line side common lines and the six signal line side common lines are laid out with equal intervals in the cut removal region of said one substrate.

It is possible to standardize patterns of the test pads including scan lead lines also, thereby enabling the intended inspection of liquid crystal display devices of multiple types of products to be carried out by use of a test apparatus or equipment having a common probe or probes.

(6) The remaining substrate has thereon more than one counter electrode, the test pads of the three or four scan line side common lines and the six signal line side common lines are disposed in the cut removal region of said one substrate, and a test pad for connection to a lead line of the counter electrode is disposed along with the test pads of the three or four scan line side common lines and the six signal line side common lines.

It is possible to further promote standardization of patterns of the test pads including scan lead lines also, thereby enabling the intended test of liquid crystal display devices of multiple types of products to be carried out by use of a test apparatus or equipment having a common probe or probes.

(7) The one substrate has thereon more than one counter electrode, the test pads of the three or four scan line side common lines and the six signal line side common lines are disposed in the cut removal region of said one substrate, and a test pad f or, connection to a lead line of the counter electrode is disposed along with the test pads of the three or four scan line side common lines and the six signal line side common lines.

Since it is possible to dispose those lead lines of counter electrodes required for turn-on or "lighting" tests also in the form of a standard pattern along with the test pads of the scan line side common lines and signal line side common lines, it becomes possible to further promote standardization of the test pad patterns, thereby enabling the intended test of liquid crystal display devices of multiple types of products to be carried out by use of a test apparatus or equipment having a common probe or probes.

One significant feature of the present invention as disclosed and claimed herein lies in separation of the signal side common lines at least in units of respective colors of the color filters in the way stated previously. This invention does not exclude arrangements for performing inspection while causing only the same signal to be input to a video signal line concerning each color in any event. However, separating the signal side common lines at least in units of colors of the color filters, as stated above, makes it possible to reduce probe costs due to reduction of the requisite number of test pads to thereby enable achievement of tests with colors being displayed, while at the same time enabling execution of the intended-test procedure with a high accuracy. In cases where the color filters are of the three primary colors of red, green and blue, any kinds of tests become available with respect to almost every color to be displayed by products through individual inspections of red, green and blue produced by lighting in units of respective colors, in addition to a white display with all colors being brightened at one time, and further by lighting while controlling the gray-scale gradation levels of each color.

This means that color purity tests of respective colors become possible, which is a significant advantage of the arrangement incorporating the principles of the invention. Further, a demonstrable improvement in test accuracies of display irregular ties is realized, which is an effect that will no longer be attained by exclusive use of all-color simultaneous lighting schemes. The color filters are formed by a process including the steps of performing deposition and exposure plus development separately in units of colors thereof, or alternatively by letting the individual colors be impregnated. Accordingly, in-plane uniformity or distribution within a plane of the film thickness will take place in units of respective colors. In the case of lighting all colors at once, the influences of these will normally become imperceptible. For example, in case only the film thickness of red locally changes, the resultant influence of such red film thickness local change upon brightness or luminance during simultaneous lighting of all of the three colors of red, green and blue becomes $1/3$ of that during unicolor lighting of red. Accordingly, the only use of all-color simultaneous lighting would result in occurrence of luminance irregularities-in particular, a decrease in inspection sensitivities as to color irregularities, which leads to risks of outflow of defective products into the market. With the instant invention, it is possible, by separating the signal side common lines at least in units of respective colors of the color filters in the way stated supra, to establish tests with the colors being lit individually, which in turn makes it possible to realize probe cost reduction and test cost reduction as well s to perform lighting tests on high-precision products, while retaining test accuracies concerning luminance and color irregularities.

Although this test scheme is advantageous especially for FCA, similar results are also obtainable in TCP schemes through separation of the signal side common lines at least in units of colors of the color filters.

Another significant feature of the invention is that the signal side common lines are separated at least in units of colors of the color filters and for use as positive and negative polarities. Whereby, if the color filters are of three colors, by way of example, then the resulting signal side common lines become six lines. Currently available liquid crystal display device drive methods include two major ones: a common inversion driving method and dot inversion drive method. In the common inversion drive method, at least three signal line side common lines are employed, as discussed above, due to the fact that in most cases the pixels neighboring in a scan signal line extension direction have the same polarity relative to the reference signal potential. On the contrary, in the dot inversion drive method, neighboring pixels in the scan signal extension direction are ordinarily driven in such a way that they have opposite polarities relative to the reference signal potential. Due to this, in the case of using three signal line side common lines in dot inversion events, six certain pixels neighboring in the scan line extension direction become "+−++−+" by way of example-in this case, any intended polarity inversion is no longer realizable between B and R. Even in this case, the above-noted detection accuracies of luminance/color irregularities can be maintained almost perfectly. Regrettably, this advantage does not come without an accompanying penalty in that, it becomes difficult to accurately inspect flicker, i.e. on-screen flickering, to be checked during a lighting test procedure. Generally, this flicker will become problematic only with special patterns or only at special timings, which is less significant during real in-use events than the above-noted color/luminance irregularities; however, if such flicker stays at levels greater than a level defined by clients, then a product with the flicker must be regarded as being defective. Accordingly, with the invention, separating the signal side common lines in units of colors of the color filters and for use as the positive and negative polarities, e.g. employing six signal side common lines for use with color filters of the three primary colors, makes it possible to cause an array of six pixels of RGBRGB to have reversed polarities between adjacent pixels in a pattern of "+−+−+−" by way of example.

Further, the flicker inspection accuracy in particular is variable depending upon the influence of a very small voltage difference between pixels; thus, it is required to control any possible delays of signal waveforms during inspection. Thus, it is desirable that an increased number of test pads for input of test signals to signal line side common lines be provided with respect to each signal line, which number is given as (n−1)/2 or more, where "n" is the number of pads per unit region, which may be a chip mount region or alternatively a region with an ensemble of signal wiring leads provided therein. In Addition, to suppress probe cost increases, it is desirable that the pad number be set at 2×(n+1) or less.

It is also desirable that the number of test signal terminals for inputting test signals to scan signal lines is greater than the number of test signal terminals for input of test signals to video signal lines. This is based on a requirement for reducing input resistivities of the video signal line side while taking account of the fact that execution of the intended test/inspection with the above-noted arrangements requires that the input frequencies of certain test signals to be applied to the video signal lines during inspection be higher than or equal to input frequencies of test signals being applied to the scan signal lines.

In addition, advantages as to lower resistivities are obtainable by providing a region formed of a specific wiring layer with the lowest resistivity in the liquid crystal display device at any one of those wiring leads associated with the signal line side common lines or alternatively between the signal line side and test pads and leads associated with the scan line side common lines or between the scan line side common lines and test pads.

Furthermore, with the invention, the scan line side common lines are arranged by more than two lines. Use of a single line enables all-line simultaneous lighting. However, difficulties can occur in regard to the above-mentioned flicker lighting inspection. More specifically, for either one of the common inversion driving and dot inversion driving methods, drive is carried out in real in-use states in such a way that two neighboring pixels in an extension direction of video signal lines are reversed in polarity relative to each other. This is for the purpose of flicker suppression. Thus, in order to perform inspection as to flicker, it is required to effect a drive in such a way that two neighboring pixels in the video signal line extension direction are mutually reversed in polarity. As the use of a single scan line side common line must result in such two pixels having the same polarity, there is a problem that no flicker tests are achieved in real in-use states. In view of this, by employing two lines for permitting two neighboring pixels to be deviated or shifted in write timing, it becomes possible to effect a drive in such a way that the two neighboring pixels in the video signal line extension direction are mutually reversed in polarity, thus enabling the intended flicker test.

In addition, with regard to flicker, the influence of a "jump-in" voltage upon writing into a TFT is also present. To let this be closer to a real-use state, it is desirable that more than three scan line side common lines be employed in specific liquid crystal display devices using the so-called Cadd scheme with a capacitor for storage of electrical charge written into a pixel electrode being formed in particular between the pixel electrode and scan signal line at the rear stage. Since with this technique the front stage pixel Cadd is formed on a scan signal line at the self stage and, further, the self stage pixel Cadd is formed on a scan signal line at the rear stage, any intended writing into pixels in a way equivalent to real use events is realized by scanning a pixel at the self stage and its front and rear pixels in a specified order of sequence similar to that during real use states. Additionally, in certain schemes that do not constitute Cadd such as for example the Cstg scheme or the like, writing equivalent to real use events is possible even when the scan line side common lines consist of two lines; however, in regard to the influence of voltage potentials due to capacitive coupling between pixels, the use of more than three scan line side common lines in a similar manner exhibits an effect for approximation to real in-use states.

Note here that in the case of three lines, at six pixels ABCDEF aligned in a direction along the image signal line extension direction, the polarities of respective pixels relative to a reference signal potential become "+−++−+" by way of example, resulting in occurrence of a problem that pixels C and D, for example, have the same polarity. To avoid this problem, it will be desirable that the scan line side common lines consist of an even number of lines. In view of the problem in the Cadd scheme, it is deemed most effective to arrange them while employing four lines as a minimal number in the Cadd scheme or using two or four lines in the Cstg scheme.

The present invention should not be limited to the above-stated arrangements or arrangements of embodiments to be set forth later in the description and ideas as disclosed therein. A variety of modifications and alterations will be possible without departing from the true spirit and scope of the invention.

Several preferred embodiments of the instant invention will now be described in detail with reference to the accompanying drawings. Although the following embodiments will be set forth in conjunction with liquid crystal display devices of the so-called TN type, the same applied to basic configurations of portions of devices of the IPS (lateral electric field) type to which the invention is applied, except that counter electrode lead lines are drawn out on the thin-film transistor substrate side.

In addition, in the explanation presented below also, signal lines are also called drain lines, whereas scan lines are called gate lines.

BRIEF DESCRIPTION OF THE DRAWINGS

FIG. 1 is a diagram showing a plan view of one preferred embodiment of a liquid crystal display device in accordance with the present invention.

FIG. 2 is a partly enlarged diagram of a test pad formation region TTP of FIG. 1.

FIG. 8 is a timing diagram showing display data as input from a signal source (main body) to a display control device and signals being output from the display control device to drain and gate drivers.

FIGS. 11.(a) and 11(b) are diagrams of test terminals in one prior art liquid crystal display device.

FIGS. 13(a) and 3(b) are diagrams of a lead wiring pattern at a main part of one embodiment of the liquid crystal display device in accordance with the invention.

FIGS. 25(a) to 25(c) are diagrams showing pictorial views of test signals in one embodiment of the liquid crystal display device in accordance with the invention.

FIGS. 26(a) to 26(c) are diagrams showing pictorial views of test signals in one embodiment of the liquid crystal display device in accordance with the invention.

FIGS. 27(a) to 27(c) are diagrams showing pictorial views of test signals in one embodiment of the liquid crystal display device in accordance with the invention.

FIGS. 28(a) to 28(c) are diagrams showing pictorial views of test signals in one embodiment of the liquid crystal display device in accordance with the invention.

FIGS. 29(a) to 29(c) are diagrams showing pictorial views of test signals of one embodiment of the liquid crystal display device in accordance with the invention.

FIGS. 30(a) to 30(c) are diagrams showing pictorial views of test signals of one embodiment of the liquid crystal display device in accordance with the invention.

FIGS. 31(a) to 31(c) are diagrams showing pictorial views of test signals of one embodiment of the liquid crystal display device in accordance with the invention.

DETAILED DESCRIPTION OF THE INVENTION

Figure 3:
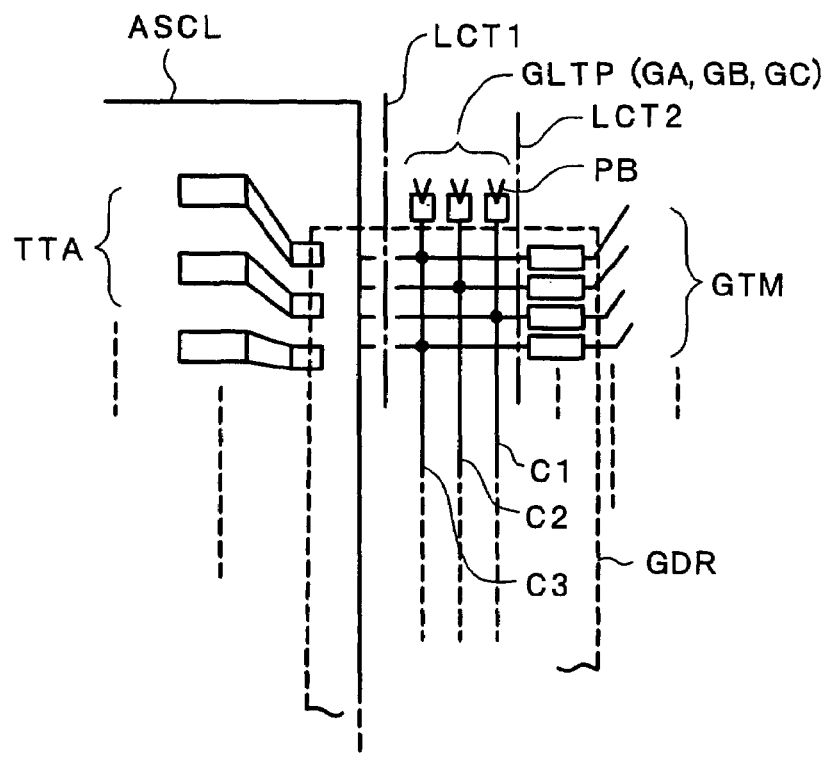
FIGS. 3(a) and 3(b) are diagrams showing pictorial representation of wiring leads at a main part of one embodiment of the liquid crystal display device in accordance with this invention.
Figure 3:
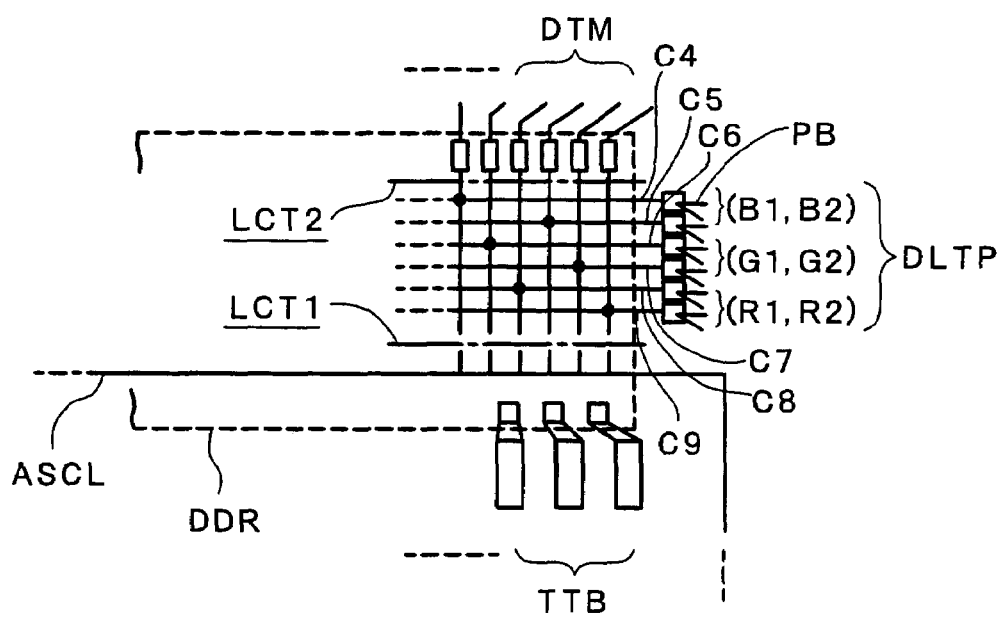

FIG. 1 is a diagram showing a plan view of a liquid crystal display device in accordance with one embodiment of the present invention. This liquid crystal display device includes a lamination of one substrate SUB1 and a remaining substrate SUB2 with a liquid crystal layer interposed between them. The one substrate SUB1 has formed on its inside surface a matrix array of thin-film transistors, not shown. The other substrate SUB2 has formed on its inside surface three primary color filters and more than one counter electrode. A counter voltage will be applied to the counter electrode via a wiring line or lines (not shown) formed on the inner surface of one substrate SUB1.

The one substrate SUB1 is greater in dimension so as to extend at its left side and lower side, as seen in FIG. 1, beyond the edges of the other substrate SUB2 so as to have exposed inner surface portions. Eleven scan drive ICs (gate drivers) GDR are mounted by FCA schemes at the left side peripheral portion, whereas eleven signal drive ICs (drain drivers) DDR are mounted at the lower side periphery (in FIG. 1, these elements are shown by their mount positions).

The one substrate SUB1 has a test pad formation region TTP. Part with this test pad formation region TTP is disposed on a portion of the substrate SUB1 which will be cut and removed along a cut line CTL after completion of the liquid crystal display device.

FIG. 2 is an enlarged diagram of the test pad formation region TTP of FIG. 1. The test pad formation region TTP is formed in a cut removal region of one substrate SUB1, which portion will be cut away along cut line CTL of the final product. This test pad formation region TTP is arranged such that gate driver side test pads GLTP and drain driver side test pads DLTP plus test pads Vcom of the counter electrode lead lines are linearly laid out at equal intervals.

The gate driver side test pads GLTP are classified into three or four groups, whereas the drain driver side test pads DLTP are classified into six groups, wherein ten to eleven test pads in total are provided, along with the counter electrode lead-line test pad Vcom. Accordingly, with this illustrative embodiment, it is possible to perform all the tests at one time by use of an array of ten to eleven probes that are equally spaced.

Alternatively, it is also possible to dispose the gate driver side test pads GLTP and drain driver side test pads DLTP in such a way that they are separated from each other, which in turn makes it possible to provide a design in which these test pads and the associated counter electrode lead line test pad Vcom are provided at an appropriate position for use in carrying out a gate driver side test and drain driver side test independently of each other.

In this way, the above noted embodiment is capable of increasing the width and length plus the layout pitch of the test pads to be connected to signal line leads; and, thus, it becomes possible to enhance the contact accuracy, while at the same time facilitating production of the probes to be used. In addition, it is possible by standardization of such probes to manufacture a test apparatus or equipment capable of offering enhanced applicability to a wide variety of different types of products.

FIGS. 3(a) and 3(b) are pictorial representations of wiring patterns at main parts of the liquid crystal display device in accordance with one embodiment of the instant invention, wherein FIG. 3(a) shows gate line side wiring leads, whereas FIG. 3(b) shows drain side wiring leads. In FIG. 3(a), reference character "GDR" designates gate driver mount positions; GTM denotes gate driver output terminals (gate line lead terminals); TTA indicates gate driver input terminals; ASCL denotes a static electricity suppression common line; C1, C2, C3 denote three scan line side common lines for common connection of three groups of gate line leads of multiple gate drivers corresponding to the front stage, next stage and rear stage thereof, or, alternatively, four groups, in order to change polarities in units of dots; GLTP (GA, GB, GC) denotes test pads formed at respective scan line side common lines C1, C2, C3; PB denotes a probe; and LCT1 and LCT2 denote laser cut lines. The test pads GLTP (GA, GB, GC) formed at respective scan line side common lines C1, C2, C3 are disposed at specified locations, as shown in FIG. 2.

In this wiring structure, in FIG. 3(a) showing the gate driver side, after completion of manufacturing of the one substrate SUB1, the scan line side common lines C1, C2, C3 are cut away along the laser cut line LCT1 for separation from the static electricity suppression common line ASCL. Cutting the scan line side common lines C1, C2, C3 away from the static electricity suppression common line ASCL results in respective scan line side common lines C1, C2, C3 becoming test wiring leads of three or four independent systems.

In this state, probes PB are attached to the test pads GLTP (GA, GB, GC) formed at respective scan line side common lines C1, C2, C3 to thereby execute the intended connection failure test and turn-on or "lighting" test.

After having finished the test procedure, respective scan line side common lines C1, C2, C3 are separated from the gate driver output terminals GTM at the laser cut line LCT2; and, then, gate drivers are FCA mounted between the output terminals GTM and the gate driver input terminals TTA.

Similarly, in FIG. 3(b) showing the drain driver side, after having manufactured the one substrate SUB1, the signal line side common lines C4, C5, C6, C7, C8, C9 are cut away along the laser cut line LCT1 for separation from the static electricity suppression common line ASCL. Cutting the signal line side common lines C4, C5, C6, C7, C8, C9 away from the static electricity suppression common line ASCL results in respective signal line side common lines C4, C5, C6, C7, C8, C9 becoming test wiring leads of six independent systems.

In this state, probes PB placed in contact with the test pads DLTP (B1, B2, G1, G2, R1, R2) formed at respective signal line side common lines C4, C5, C6, C7, C8, C9 to thereby execute the intended connection failure test and lighting test.

After having completed the tests, respective signal line side common lines C4, C5, C6, C7, C8, C9 are separated from the drain driver output terminals DTM at the laser cut line LCT2; and, then, drain drivers are FCA mounted between the output terminals DTM and the drain driver input terminals TTB.

Additionally, in the lighting test, a probe is attached to the counter electrode lead line test pad Vcom for application of a specified voltage to thereby create an electric field for controlling the orientation of liquid crystals between it and a pixel electrode connected to the output electrode of a thin-film transistor, thus checking for the presence or absence of turn-on or "lighting" of a pixels.

Optionally, the laser cut lines LCT1, LCT2 are replaceable with etching cut lines f or use in separation through etching processes. Other known similar suitable cutting methods are also employable.

Figure 4:
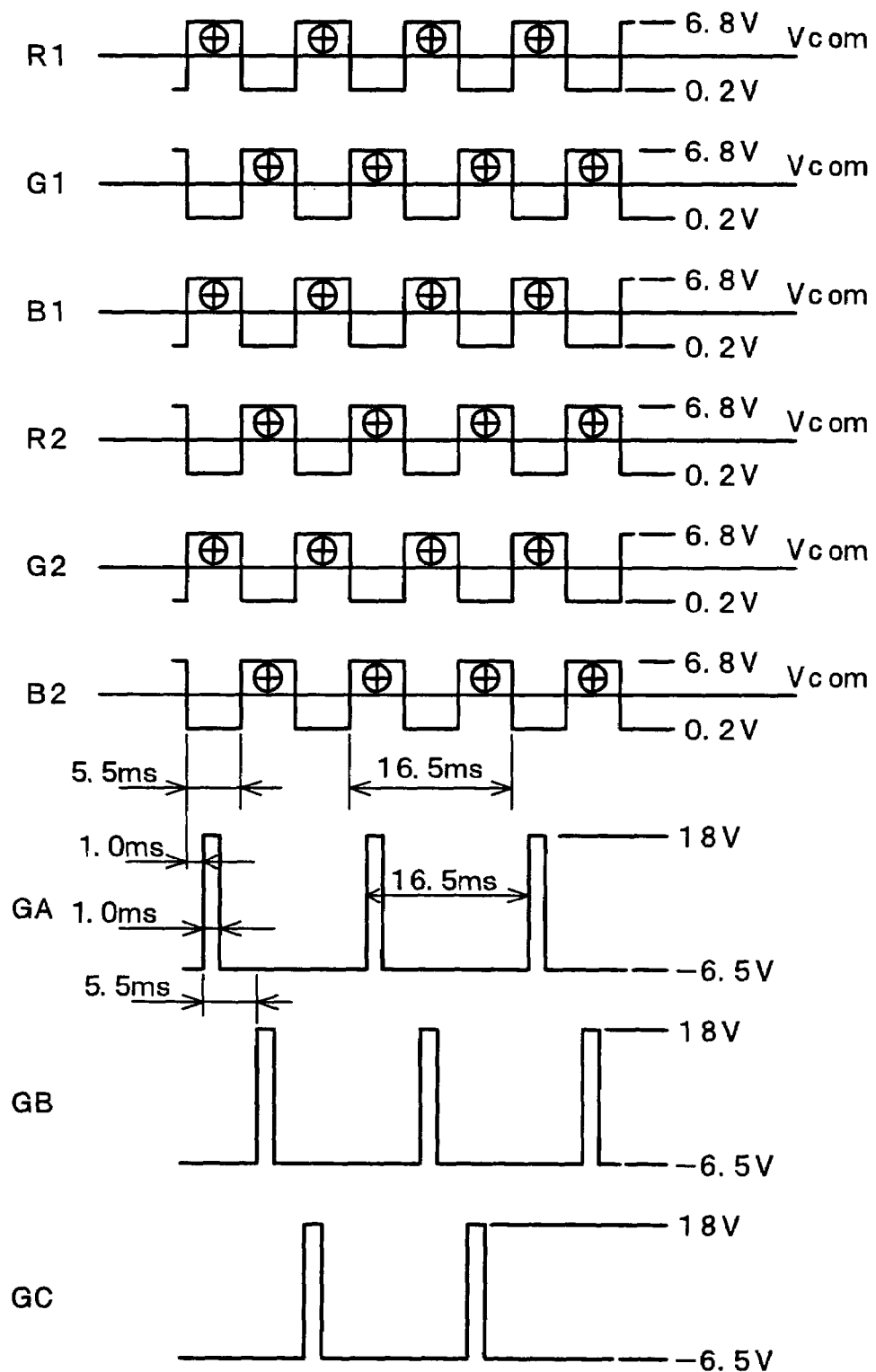
FIG. 4 is a waveform diagram for explanation of exemplary test signals as applied to drain test pads and gate test pads during a turn-on test of one embodiment of the liquid crystal display device in accordance with the invention.

FIG. 4 is a waveform diagram illustrating exemplary test signals to be applied to the drain test pads DLTP (B1, B2, G1, G2, R1, R2) and test pads GLTP (GA, GB, GC) during the lighting test procedure according to one embodiment of the liquid crystal display device of this invention. Note here that these test signals are of the so-called dot inversion scheme, wherein the illustrative voltage value pulse widths and pulse intervals and others are mere examples.

Applying the test signals shown in FIG. 4 to respective test pads makes it possible to execute a lighting test through turn-on of a certain display pattern on a per-system basis.

With this embodiment, it is possible to provide the intended liquid crystal display device having a unique wiring lead structure capable of a variety of tests by simultaneous contact of probes with all the terminals in an all-at-a-time manner, while making it possible by standardization of the pattern of test terminals to employ test equipment having probes for common use with a wide variety of different types of products.

Figure 5:
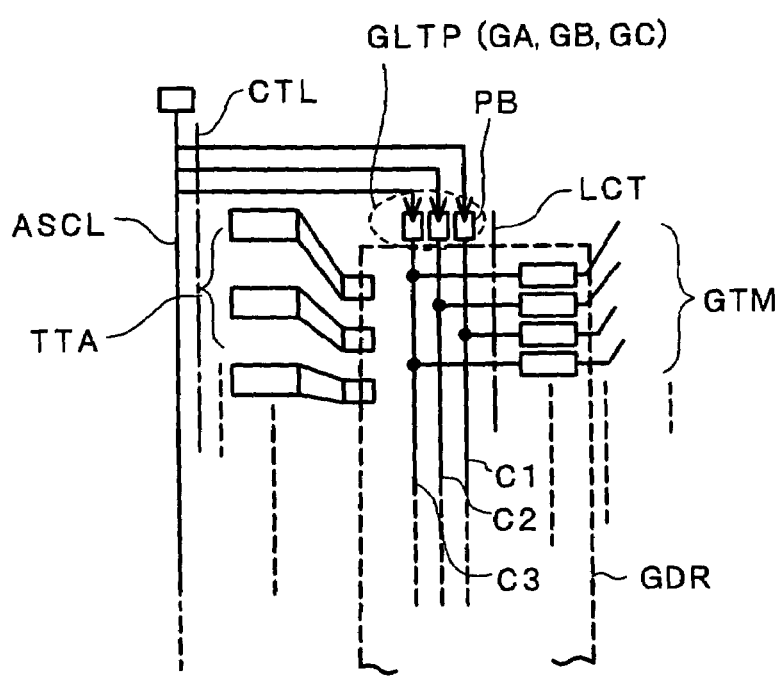
FIGS. 5(a) and 5(b) are diagrams showing pictorial representations of major wiring leads at a main part of another embodiment of the liquid crystal display device in accordance with the invention.
Figure 5:
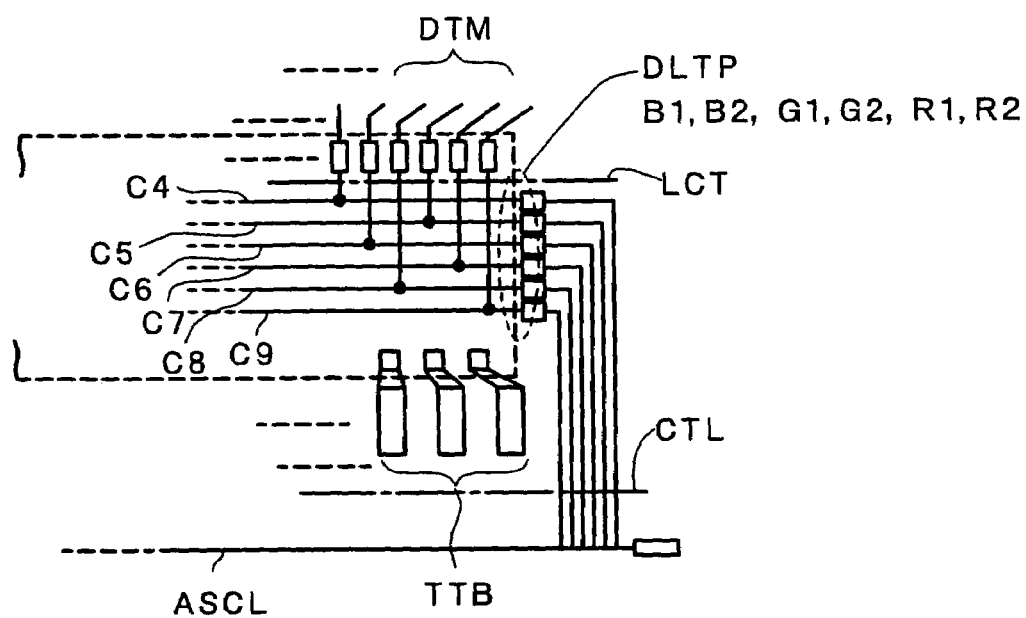

FIGS. 5(a) and 5(b) are pictorial representations of wiring patterns at main parts of another embodiment of the liquid crystal display device in accordance with the invention, wherein FIG. 5(a) shows gate line side wiring leads, whereas FIG. 5(b) shows drain side wiring leads. In FIGS.

5(a) and 5(b) the same reference characters are used to designate corresponding parts having the same functions as the parts shown in FIGS. 3(a) and 3(b).

In the embodiment shown herein, the scan line side common lines C1, C2, C3 are connected to the static electricity suppression common line ASCL at a location outside the cut lines CTL, rather than to the gate driver input terminals TTA. Similarly, the signal line side common lines C4, C5, C6, C7, C8, C9 are connected to the static electricity suppression common line ASCL at a location outside the cut lines CTL, rather than to the drain driver input terminals TTB.

With such an arrangement, it becomes possible when cutting on the static electricity suppression common line ASCL after production of the substrate SUB1 to make the respective groups or "systems" formed of the scan line side common lines C1, C2, C3 and the signal line side common lines C4, C5, C6, C7, C8, C9 independent of one another. This in turn makes it possible to reduce by one the requisite number of laser cut (or etching cut) processes.

With this embodiment also, it is possible to provide the intended liquid crystal display device having a unique wiring lead structure capable of accommodating a variety of tests by simultaneous contact of probes with all the terminals in an all-at-a-time manner, while making it possible by standardization of the pattern of test terminals to employ test equipment having probes for common use with a wide variety of types of different products.

As another embodiment of the invention, the signal line side common lines C4, C5, C6, C7, C8, C9 in FIG. 3(b) are "disassembled" between respective blocks; and, then, a test pad (s) is provided between respective blocks. Thus, it is possible to increase the number of kinds of display patterns for use during inspection.

It should be noted that, although in the respective embodiments stated supra the gate side is designed into three or four groups or "systems" for provision of the common lines C1, C2, C3, this may be modified as still another embodiment of the invention in a way such that the gate line side is tested through simultaneous attachment of the probes to all the terminals concerned, as in the prior art, in view of the fact that the gate side terminals are designed to have relatively large terminal widths and pitches when compared to the drain side terminals. One preferred configuration of this embodiment is shown FIG. 11(a).

In addition, as yet another embodiment of the invention, transistors or diodes are disposed between the scan line side common lines C1, C2, C3 and the signal line side common lines C4, C5, C6, C7, C8, C9 shown in FIGS. 3(a) and 3(b) or FIGS. 5(a) and 5(b), on the one hand, and the gate driver output terminals (gate line lead terminals) GTM and drain driver output terminals (drain line lead terminals) DTM, on the other hand, for separation between respective lines with respect to test signals.

With any one of the above-noted embodiments, it is also possible to provide the intended liquid crystal display device having a unique wiring lead structure capable of accommodating a variety of tests by simultaneous contact of probes with all the terminals in an all-at-a-time manner, while making it possible by standardization of the pattern of test terminals to employ test equipment having probes for common use with a wide variety of different types of products.

Although only liquid crystal display devices of the type with gate drivers and drain drivers that are mounted using so-called FCA mount techniques are explained in connection with the above embodiments, the test circuitry of this invention may also be applied to liquid crystal display devices of the type in which such drivers are mounted using prior known TCP techniques.

An explanation will next be given of an example of the entire arrangement of a liquid crystal display device embodying the invention, along with examples of its operatively associated drive system and application equipment.

Figure 6:
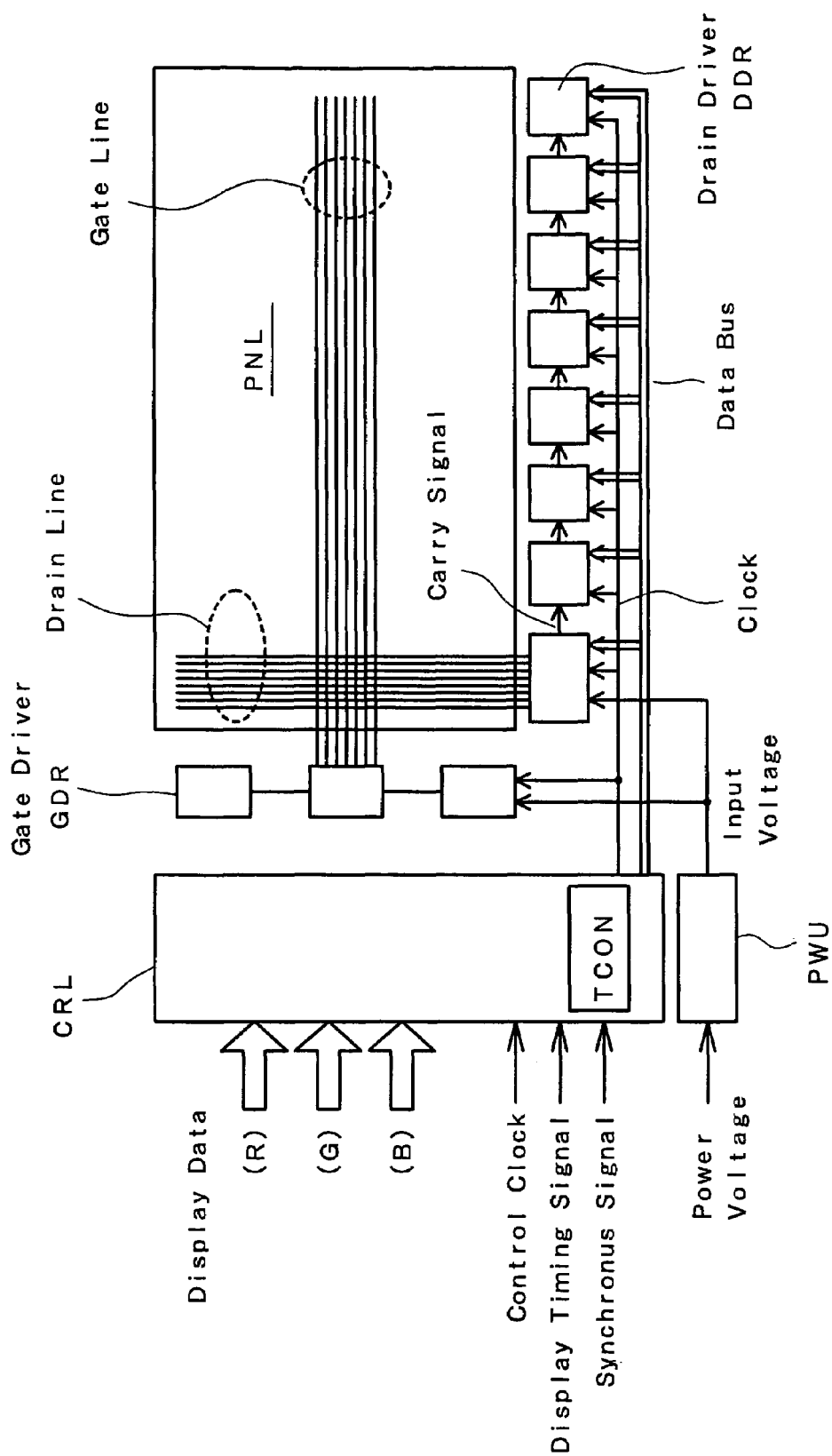
FIG. 6 is a block diagram showing the arrangement of a drive system of a standard active-matrix liquid crystal display device to which the invention is applied.

FIG. 6 is a block diagram of a drive system of an ordinary or standard active-matrix liquid crystal display device to which the invention is applied. This liquid crystal display device comprises a liquid crystal panel PNL including two substrates with a liquid crystal layer disposed therebetween, data line (drain signal line or drain line) drive circuits (IC chips) corresponding to the aforesaid drain drivers DDR at the periphery of this liquid crystal panel, scan line (gate signal line or gate line) drive circuits (IC chips) Corresponding to said gate drivers GDR, a display control device CRL for use, as display control means for supplying these drain drivers DDR and gate drivers GDR with display data and/or clock signals along with gray-scale gradation voltages and the like for image display operations, and a power supply circuit PWU.

Signals coming from an external signal source, such as a computer, personal computer, television receiver circuitry or the like, which include display data (said display signals), control signal clocks, display timing signals and synchronization signals, are input to the display control device CRL. The display control device CRL is provided with a gradation reference voltage generating unit, a timing converter TCON and other elements, and is operable to convert externally incoming display data into certain data of the format adaptable for display on the liquid crystal panel PNL.

Display data and clock signals f or the gate drivers GDR and drain drivers DDR are supplied in the way shown in FIG. 6. A carry output at the front stage of drain driver DDR is directly supplied with no changes to a drain driver carry input at the next stage.

Figure 7:
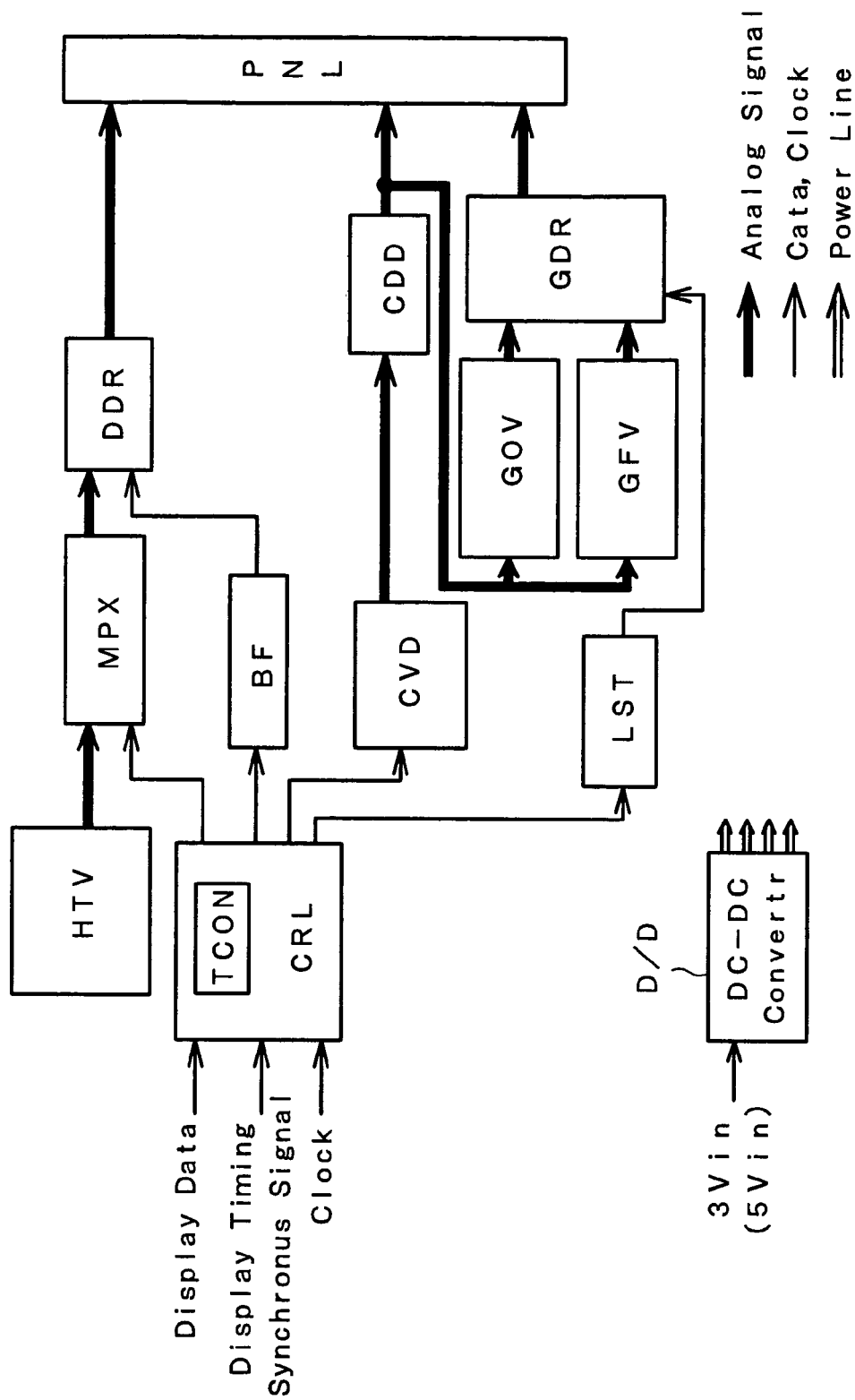
FIG. 7 is a block diagram schematically showing an arrangement of each driver of a liquid crystal panel along with a flow of signals therein.

FIG. 7 is a block diagram showing a schematic arrangement of respective drivers of the liquid crystal panel and also signal flows therein. A drain driver DDR is constituted from a data latch unit for latching display data (display signal), such as a video (image) signal or the like, and an output voltage generation circuit. In addition, a gray-scale or gradation reference voltage generator HTV, multiplexer MPX, common voltage generator CVD, common driver CDD, level shift circuit LST, gate-on voltage generator GOV, gate-off voltage generator GFD and DC-DC converter D/D are provided on a circuit board with the display control device CRL; and, the power supply circuit PWU of FIG. 6 is mounted thereon.

FIG. 8 is a timing diagram showing display data that is input from a signal source (main body) to the display control device and signals that are output from the display control device to the drain and gate drivers. The display control device CRL receives from the signal source control signals (clock signal, display timing signal and synch signal) for generating a clock D1 (CL1), a shift clock D2 (CL2) and display data as control signals being sent to drain drivers DDR, and, simultaneously, it generates a frame start instruction signal FLM, clock G (CL3) and display data as control signals passed to gate drivers GDR.

Note here that in a scheme using a low-voltage differential signal (LVDS signal) for transmission of display data from the signal source, the LVDS signal from the signal source is supplied to gate drivers GDR and drain drivers DDR after completion of conversion to an original signal at an LVDS receiver circuit, which is mounted on a circuit board (interface substrate) on which the above-stated display control device is also mounted.

As apparent from viewing FIG. 8, the drain driver's shift clock signal D2 (CL2) has the same frequency as the clock signal (DCLK) and display data input from a main-frame computer; in XGA display elements, the frequency is as high as about 40 megahertz (MHz). The liquid crystal display device thus arranged features a reduced thickness and low power consumption, and is expected to be widely employed as a display device in various fields in the near future.

Figure 9:
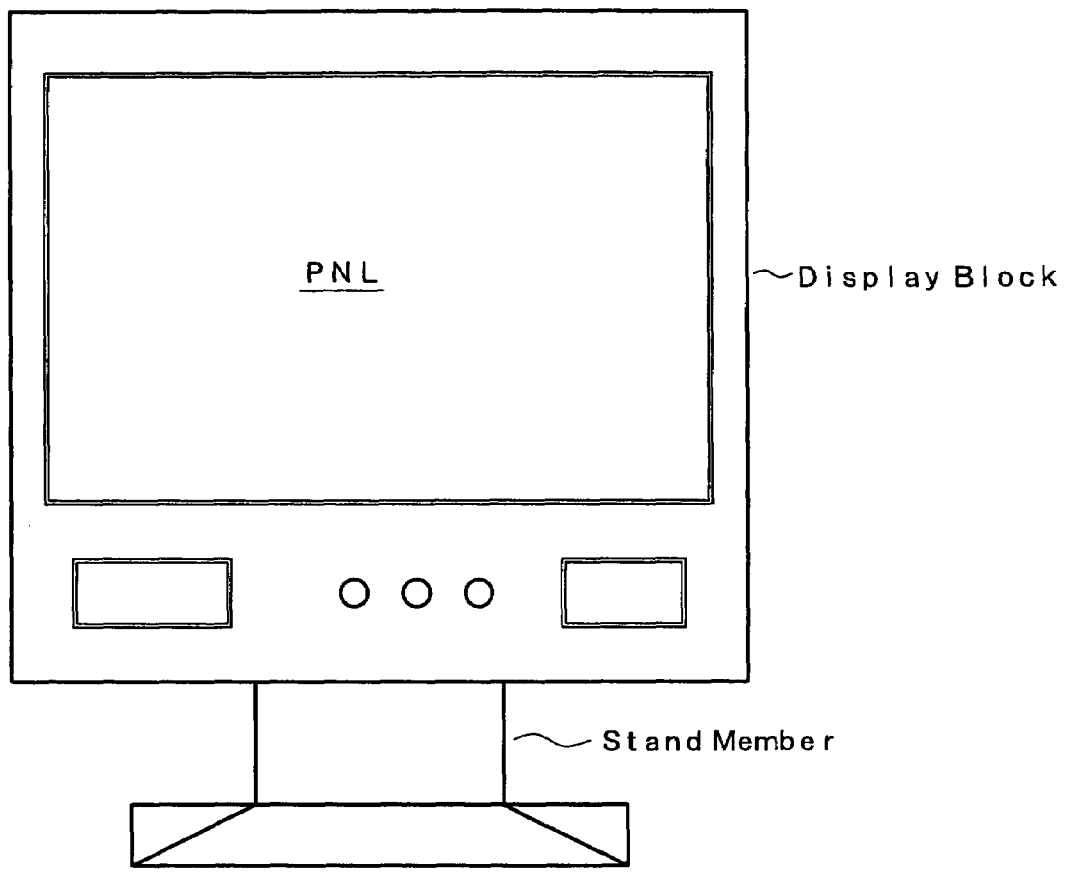
FIG. 9 is a diagram showing the exterior appearance of one exemplary display monitor for use as electronic equipment having the liquid crystal display device of the invention mounted therein.
Figure 10:
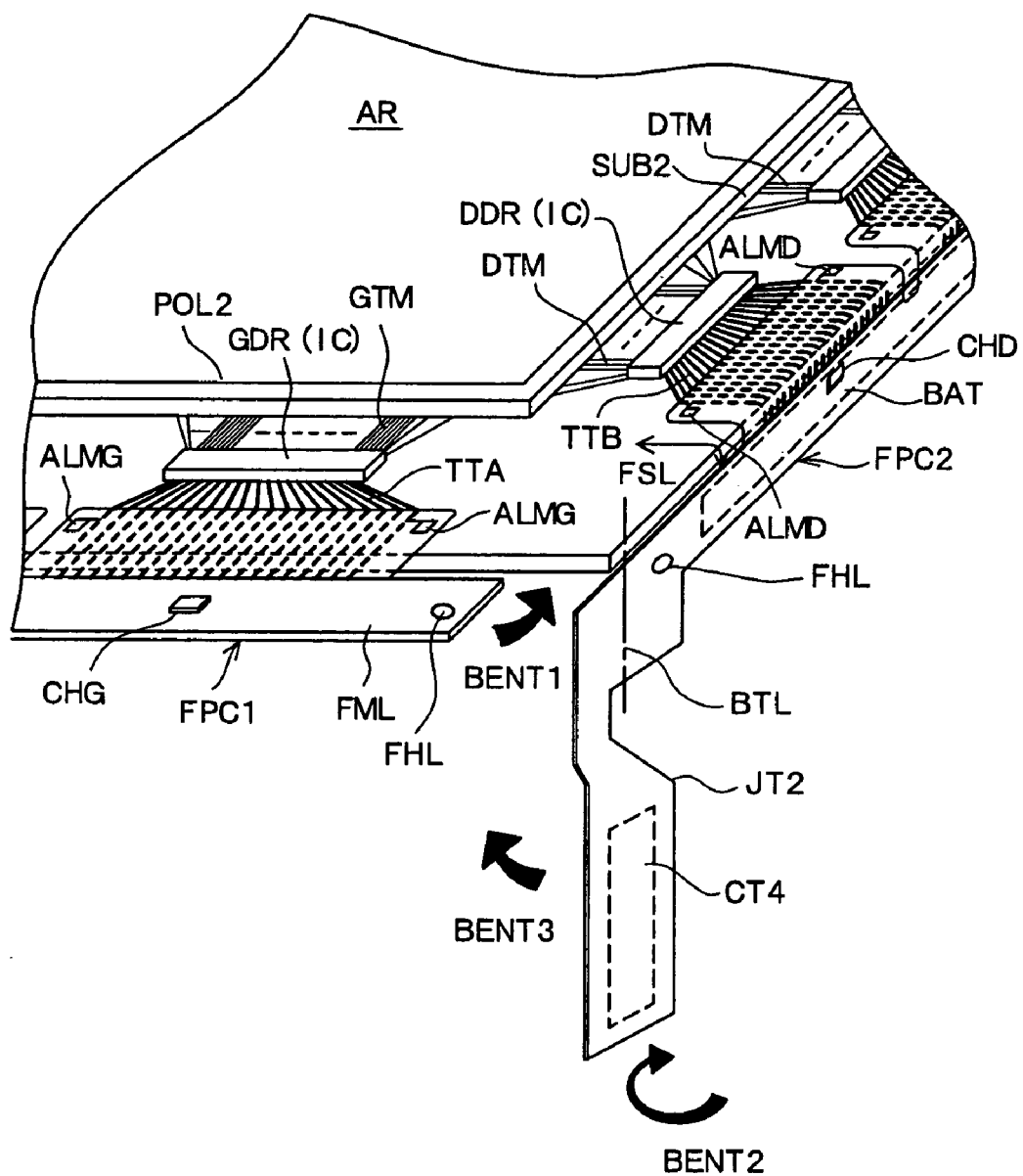
FIG. 10 is a diagram showing a perspective view of a main part of a liquid crystal display device of the type which employs the PCA mount scheme.

FIG. 9 shows the exterior appearance of one example of a display monitor adaptable for use as electronic equipment with the liquid crystal display device of the present invention mounted therein. The liquid crystal display device is mounted as a screen of this monitor, that is, a display section thereof. The liquid crystal display device constituting this display monitor is one that has passed the open-circuit test and lighting test by use of the test circuitry explained in conjunction with the embodiments of the present invention, and, thus, it is high in reliability. Thus, it is possible to obtain high-quality on-screen images for an increased length of time.

It must be noted that the liquid crystal display device incorporating the principles of the invention should not be limited to the above-noted display monitor and may alternatively be used as the monitor of a desktop personal computer and a notebook personal computer, a television receiver, and a display device of any other equipment.

An explanation will next be given of an exemplary main-part configuration of the present invention in more detail.

The scan line side common lines will be explained first.

Figure 12:
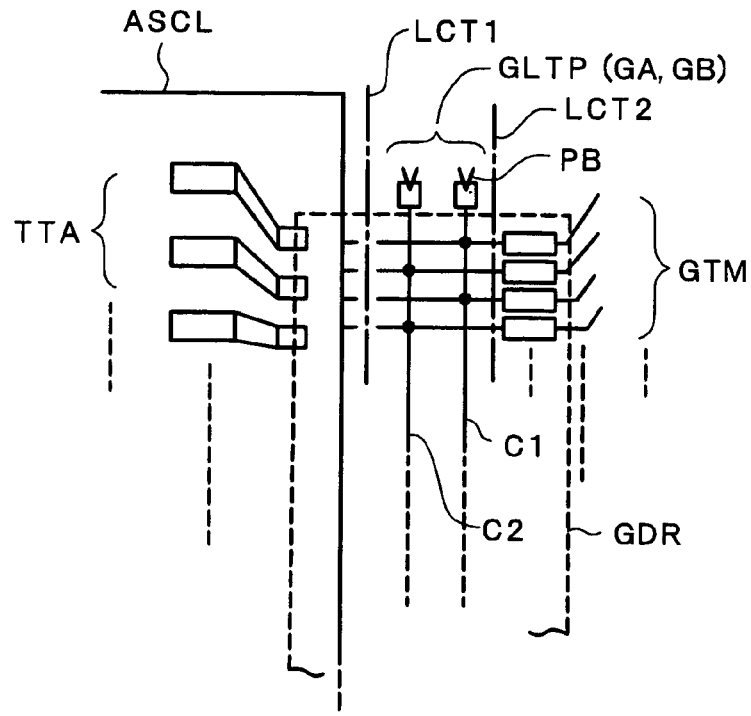
FIGS. 12(a) and 12(b) are diagrams of a lead wiring pattern at a main part of one embodiment of the liquid crystal display device in accordance with the invention.
Figure 12:
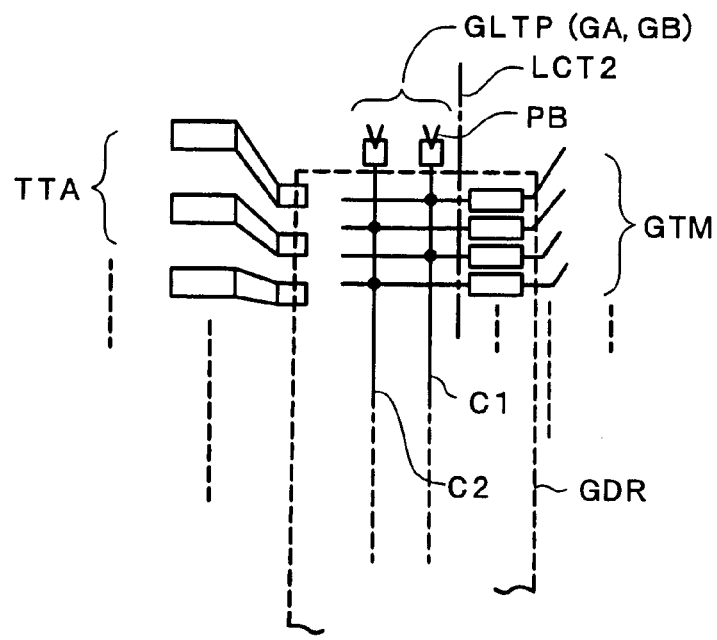

FIG. 12(a) shows an example with two lines C1, C2 being formed as the scan line side common lines.

All-line simultaneous turn-on or "lighting" is possible even when connecting neighboring scan signal lines to the same scan line side common line. However, difficulties occur in relation to flicker lighting tests. In view of this, at least two scan line side common lines are provided, as shown in FIG. 12(a).

Additionally, the above effect remains similar upon application to an arrangement with the scan signal lines and static electricity suppression common line ASCL being electrically disconnected from each other, as shown in FIG. 12(a). Further, since the scan signal lines are connected to either one of the scan line side common lines C1, C2 in units of a groups, it is possible to suppress or reduce the influence of static electricity applied thereto, as compared to the case in which the scan signal line exists alone. In this case, an ASCL cutting process will no longer be required, thus enabling reduction in the number of process steps resulting in a likewise decrease in production costs.

The storage capacitor of a pixel may be formed of either one of Cadd and Cstg.

Figure 13:
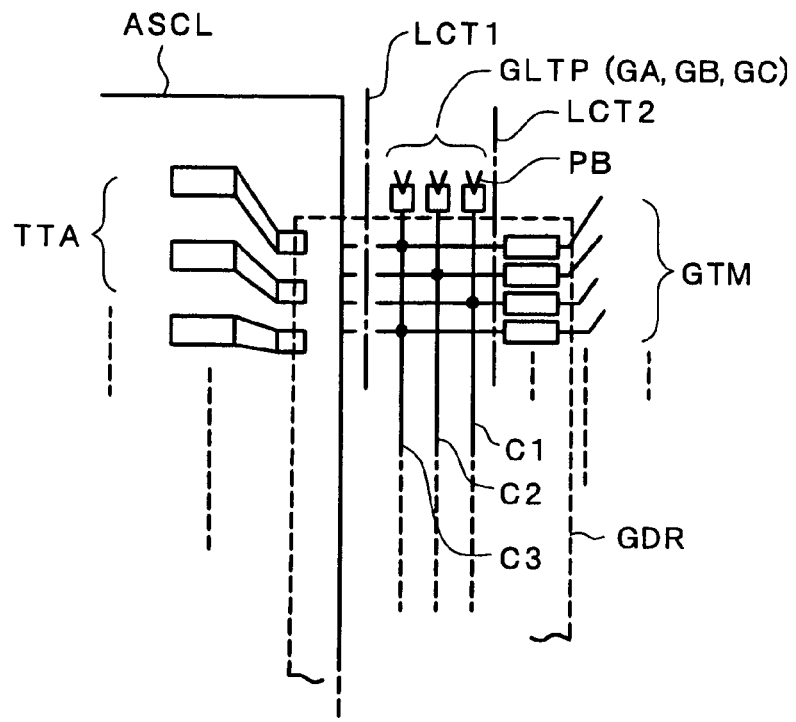
Figure 13:
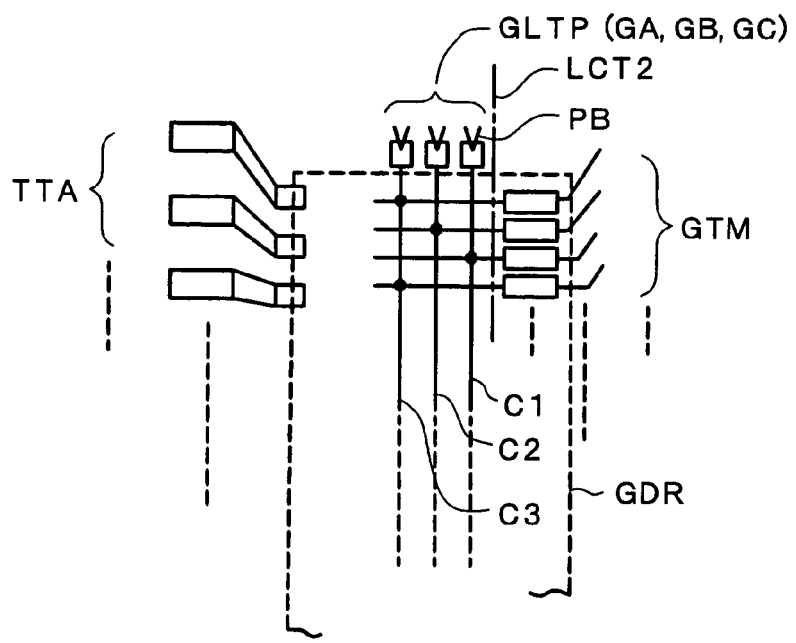

FIG. 13(a) shows an example with three lines C1, C2, C3 formed for use as the scan line side common lines, and FIG. 13(b) is an example that does not have its ASCL.

As stated as the means, in regard to flicker, the influence of a "jump-in" voltage upon writing into a TFT is also present. To let this be closer to a real-use state, it is desirable that more than three scan line side common lines be employed in specific liquid crystal display devices of the so-called Cadd type with a capacitor for storage of electrical charge that is written into a pixel electrode being formed in particular between the pixel electrode and scan signal line at the rear stage. In view of this, the illustrative embodiment is designed so that the front stage pixel Cadd is formed on a scan signal line at the self stage, and, further, the self stage pixel Cadd is formed on a scan signal line at the rear stage. Obviously, a Cstg may also be used. Note, however, that with this arrangement, for six pixels ABCDEF aligned in a direction along the image signal line extension direction, since the polarities of respective pixels relative to a reference signal potential become "+−++−+" by way of example, as has been stated as the means, resulting in occurrence of a problem that pixels C and D, for example, are the same in polarity as each other, it is desirable that four lines, as will be shown later, are employed, or, alternatively, two lines, as has been shown previously, are to be employed especially for liquid crystal display devices of the type having a pixel structure with Cadd-scheme capacitance section, the use of four lines, as will be set forth below, is more desirable.

Figure 14:
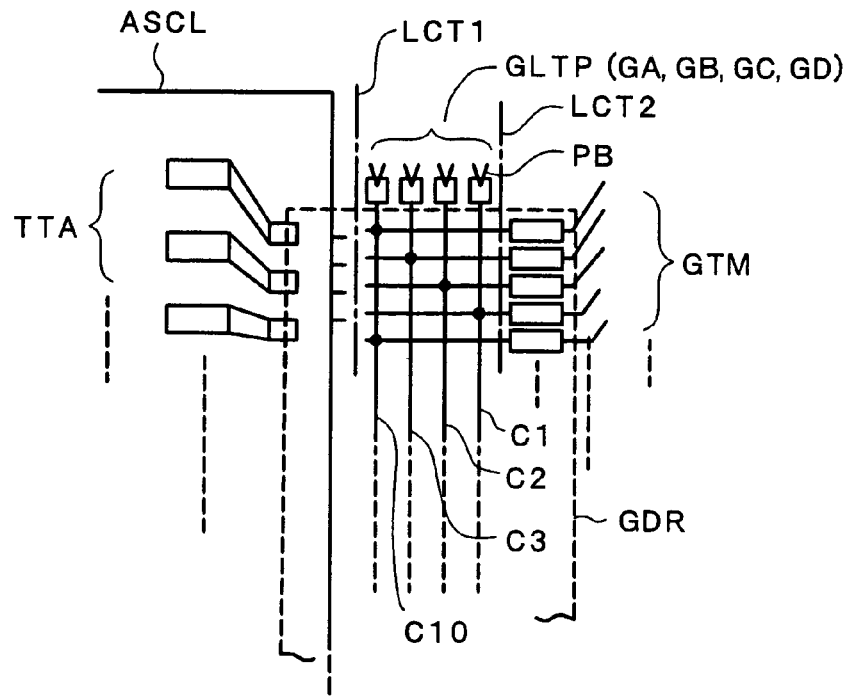
FIGS. 14(a) and 14(b) are diagrams of a lead wiring pattern at a main part of one embodiment of the liquid crystal display device in accordance with the invention.
Figure 14:
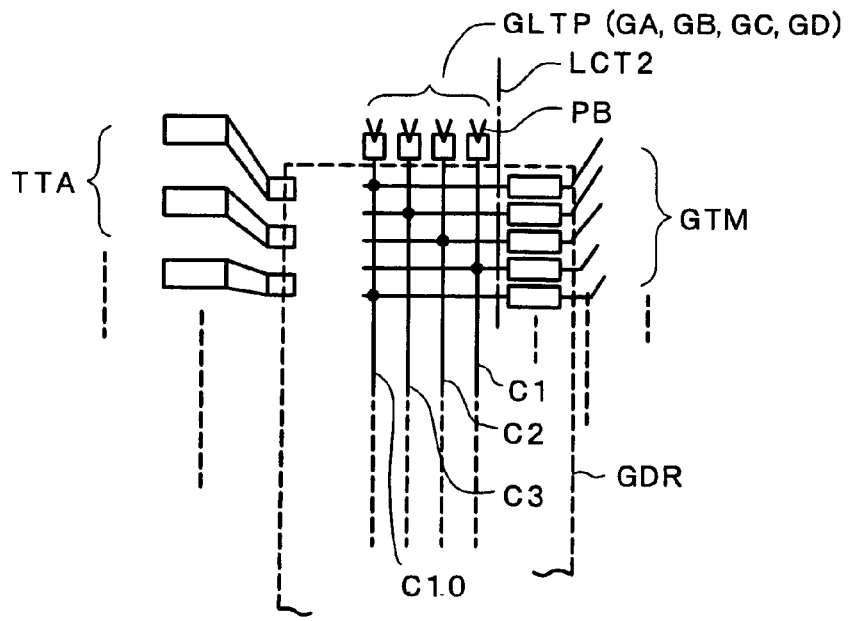

FIG. 14(a) shows an example with four lines C1, C2, C3, C10 formed as the scan line side common lines, whereas FIG. 14(b) is an example that does not have its ASCL. Whereby, it is possible for pixels in the video signal extension direction to be opposite in polarity to each other in the way stated previously. This makes it possible to perform tests that are closer to real use states, thus improving the inspection accuracy.

An explanation will next be given of the signal line side common lines.

Figure 15:
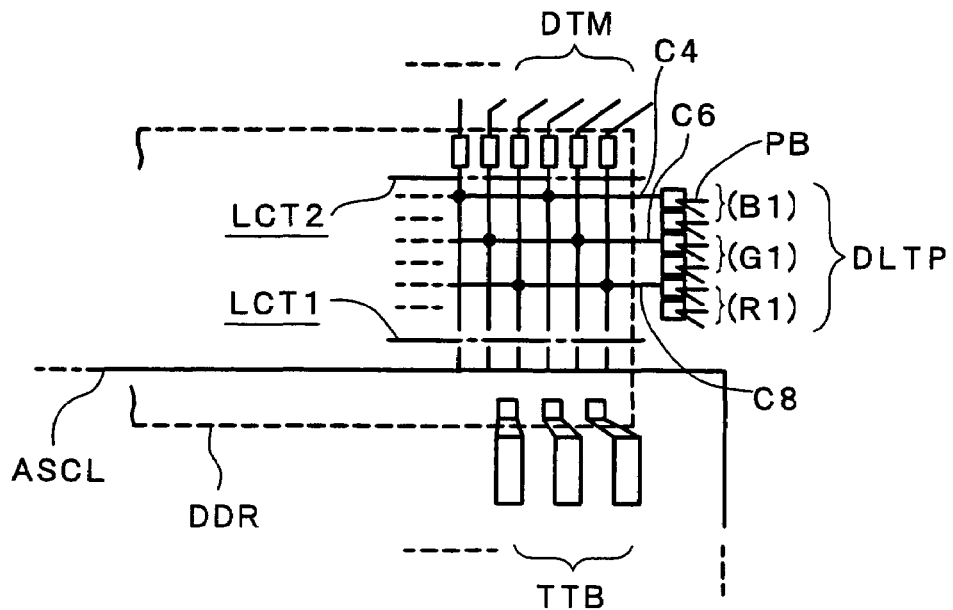
FIGS. 15(a) and 15(b) are diagrams of a lead wiring pattern at a main part of one embodiment of the liquid crystal display device in accordance with the invention.
Figure 15:
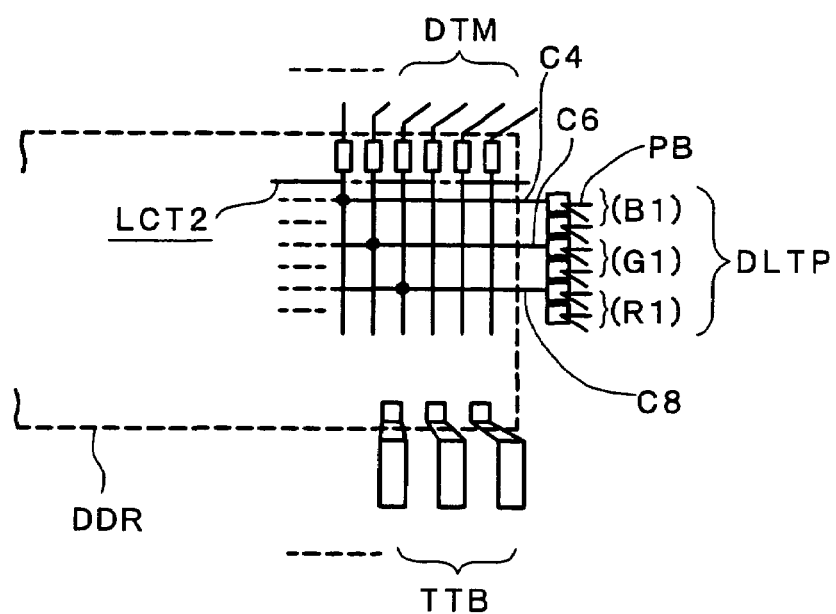

FIG. 15(a) shows an example with three lines C4, C6, C8 formed as the signal line side common lines.

One significant feature of the present invention is that the signal line side common lines are separated in units of the colors of the color filters for reduction of the requisite number of test pads to thereby reduce probe costs and also enable inspection of high-precision products, while at the same time carrying out tests through the displaying of colors. And, if such color filters are of the three primary colors of red, green and blue, any intended tests as to almost every color displayable by any products become possible by using as test patterns white produced by simultaneous lighting of respective colors and individual lighting in units of respective colors for discrete tests of red, green and blue, with or without control of gray-scale gradation levels of respective colors. Obviously, the colors should not be limited only to red, green and blue. Similar results are also obtainable with liquid crystal display devices using color filters of the so called complementary color type with cyan, magenta and yellow. The same applied to all of the embodiments set forth herein. With the present invention, color purity tests of respective colors become possible. Further, the display irregularity inspection accuracy was significantly improved for liquid crystal display devices which are inherently subjected to all-color simultaneous lighting tests only. The color filters required are formed through processes of individual deposition and exposure plus development in units of colors or, alternatively, impregnation of individual colors. Accordingly, in-plane uniformities of color densities or distribution on a film thickness plane occur in units of respective colors. In the case of simultaneous lighting of respective colors, the influences of these ordinarily become difficult to observe. For example, in a case where the film thickness of red alone locally changes, influence of such red film thickness local change upon brightness or illuminance in the event of simultaneous lighting of the three colors of red, green and blue becomes about $\frac{1}{3}$ of that in the event of the unicolor displaying of red. Thus, only the use of all-color simultaneous lighting results in a decrease in inspection sensitivity regarding illuminance irregularities-in particular color irregularities. This is the reason.

FIG. 15(b) shows an example that does not have its ASCL. With this arrangement also, certain static electricity suppression effects are realizable while reducing the requisite number of manufacturing processes in a similar way to that of the scan side common lines of FIG. 12(b).

Figure 16:
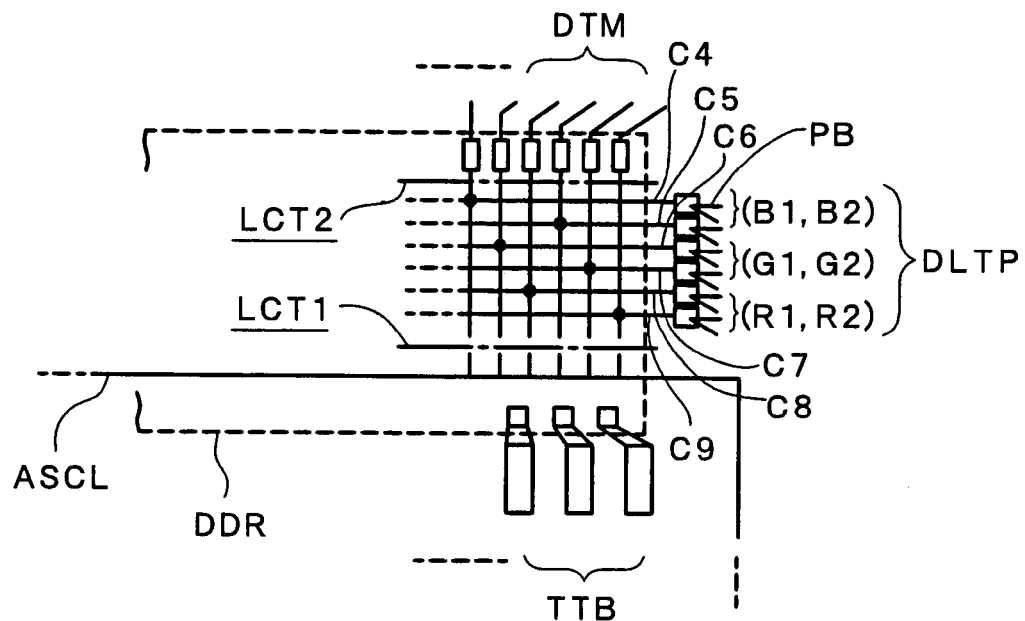
FIGS. 16(a) and 16(b) are diagrams of a lead wiring pattern at a main part of one embodiment of the liquid crystal display device in accordance with the invention.
Figure 16:
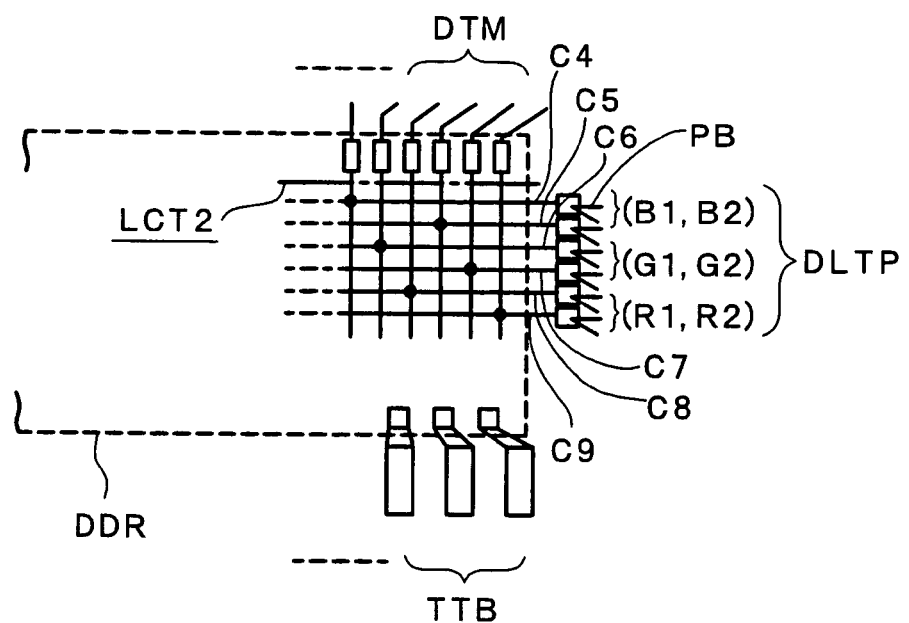

FIG. 16(a) shows an example with six lines C4, C5, C6, C7, C8, C9 formed as the signal line side common lines. This arrangement is characterized in that the signal line side common lines are separated into those for positive and those for negative polarities in units of at least colors of the color filters. More specifically, six signal line side common lines are provided with respect to color filters of the three primary colors of red, green and blue. Known liquid crystal display device driving methods typically include a common inversion drive method and a dot inversion drive method. The common inversion drive is such that at least three signal line side common lines are employed, as discussed above, due to the fact that in most cases, the pixels neighboring in a scan signal line extension direction are the same as each other in polarity relative to the reference signal potential. On the contrary, the dot inversion drive method is such that neighboring pixels in the scan-signal extension direction are ordinarily driven in such a way that these are of opposite polarities relative to the reference signal potential. Due to this, in the case of using three signal line side common lines in dot inversion events, six certain pixels neighboring in the scan line extension direction become "+−++−+" by way of example-in this case, any intended polarity inversion is no longer realizable between B and R. This makes it difficult during turn-on or "lighting" tests to accurately inspect flicker, that is, brightness irregularity. To avoid this, six signal side common lines are employed for use as positive and negative polarities in units of color filter colors, thus making it possible for six pixels of RGBRGB to have an alternate opposite polarity pattern of "+−+−+−", thereby enabling improvement of flicker inspection accuracy.

The scan line side common line arrangements shown in FIGS. 12(a) to 14(b) and the signal line side common line configurations of FIGS. 15(a) to 16(b) are combinable together whereby both effects are obtainable at one time.

An explanation will next be given of the cutting of LCT1, CLT2 shown in a respective one of FIGS. 12(a) through 16(b).

Figure 17:
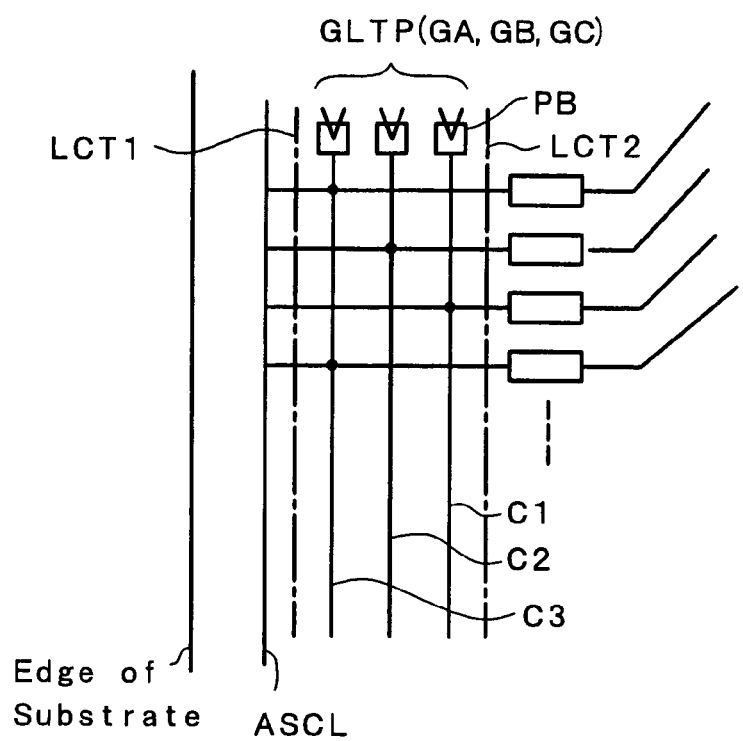
FIGS. 17(a) and 17(b) are diagrams of a lead wiring pattern at a main part of one embodiment of the liquid crystal display device in accordance with the invention.
Figure 17:
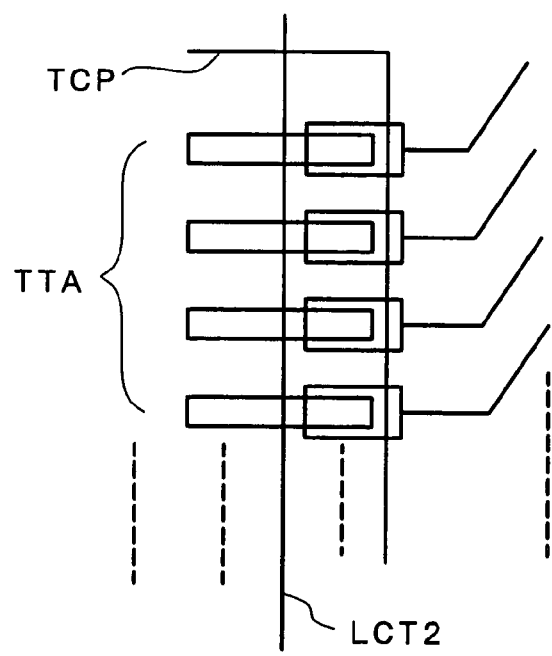

FIG. 17(a) shows one example in the case of a TCP scheme. The ASCL is formed inside of a substrate edge portion and is electrically connected to scan signal lines. At a pre-test stage, the ASCL is separated from respective scan signal lines in a region LCT1. This is for inspection of respective colors. Without this cutoff process, these lines remain connected to the ASCL resulting in connection of respective scan signal lines via scan line side signal lines so that any intended unicolor inspection is impossible. Separation may be carried out by any one of various laser beam cutting techniques, etching techniques, and techniques for cutting a substrate in the region. Laser beam cutting techniques offer the highest positioning accuracy so that it is possible to reduce the distance between the scan side signal lines and the ASCL, which advantageously makes it possible to effectively utilize the area of a mother glass plate, resulting in an increase in the size of products as taken from the same mother plate. The use of etching techniques enables all-at-a-time processing with an increased number of substrates being put into the etching liquid. In this case, a structure is required for allowing in a to-be-separated layer to be exposed in advance in a to-be-separated region, and it is desirable that a conductive layer at such part be a single layer. One exemplary arrangement is one in which a terminal section is formed of a single layer of transparent conductive material such as ITO or is covered with it while forming an etching portion using metals and also employing different etching liquids therebetween. With such an arrangement, it is possible to avoid risks of unintentional removal of the terminal section. Regrettably, in this case, a larger region than that produced by laser cut techniques is required. With a separation technique through cutting of a substrate per se, a groove is ordinarily formed by a scribing blade or laser beam, and, thereafter, a pressure is applied for cutting the substrate in the region. In this case, separate on is physically done completely; thus, risks of separation deficiency may be minimized. However, this advantage does not come without an accompanying penalty in that an unintentional region can also be cut away; for example, scan line side common lines can be cut accidentally in some cases. Determining which one of the techniques should be used mainly depends on exact arrangements of manufacturing lines. From the view point of a profit-maximum policy requiring an increase in the number of products per mother glass plate and also size maximization thereof, the use of laser cut techniques is recommended because it attains these objects successfully. Additionally, although this process is unnecessary for the arrangement with SACL and scan signal lines are separated in advance, use of the ASCL is desirable f or perfectivity purposes, while the presence of scan line side common lines per se offers certain static electricity suppression effects.

After separation, test probes PB are placed in contact with scan line side test terminals GLTP, which are provided and connected to the scan line side common lines; and, then, one or more test signals are input for inspection. Certain ones that are judged to have defects through this inspection include repairable ones, e.g. those with defects curable through correction using a laser beam. These defective ones undergo repairing processes and, thereafter, are again subjected to inspection. If the defects are satisfactorily repaired, then such liquid crystal elements will be handled as good products. Thus, it is possible to reduce the rejection rate. Note here that one principal feature of the present invention lies in its enhanced applicability to unicolor test/inspection procedures. More specifically, in regard to continuous point defects or the like at two neighboring pixels, any intended detection becomes unattainable if only the all-color simultaneous lighting scheme is supported. One example is that, if a red pixel and its neighboring green pixel are short-circuited together, then the judgment of "no abnormality" is made in the all-color simultaneous lighting event. On the other hand, with the unicolor inspection scheme, if a red pixel is turned on, then not only the red pixel, but also its neighboring green pixel will turn on simultaneously, resulting in judgment of the presence of a bright point defect. As long as defect judgeability is available at this process step, any defect found is repairable by cutting a short-circuit portion between red and green pixels by use of a laser beam, for example, thus permitting it to become a good product. However, in case only the all-color simultaneous lighting inspection is possible, such a defect will no longer be detected until later connect on to drive circuitry at a later process step. To make a correction at this stage, it is required that a polarization plate is first removed away, if such a polarization plate was attached; and, even in a case where the plate is absent, the drive circuitry will possibly be destroyed during processes for transportation toward correction apparatus and repairing works. In either case, the resulting production costs for repairing processes increase. Alternatively, other defects such as gap defects are induced during repairing processes, resulting in an increase in the correction/repair failure rate. Consequently, the enhanced applicability or "accommodatability" to unicolor test/inspection at the stage of cells leads to significant advantages as to both manufacturing yields and production costs.

A substrate judged as a good product through inspection is then subject to separation between the scan line side common lines C1, C2, C3 and the TCP connection pads TCPD along line LCT2. This separation is carried out through physical cutaway of the substrate per se. Accordingly, LCT2 becomes one terminate end of the substrate in the state of a product therearound. Thereafter, as shown in FIG. 17(a), TCP is mounted; then, the external drive circuitry and scan signal lines are connected together.

Figure 18:
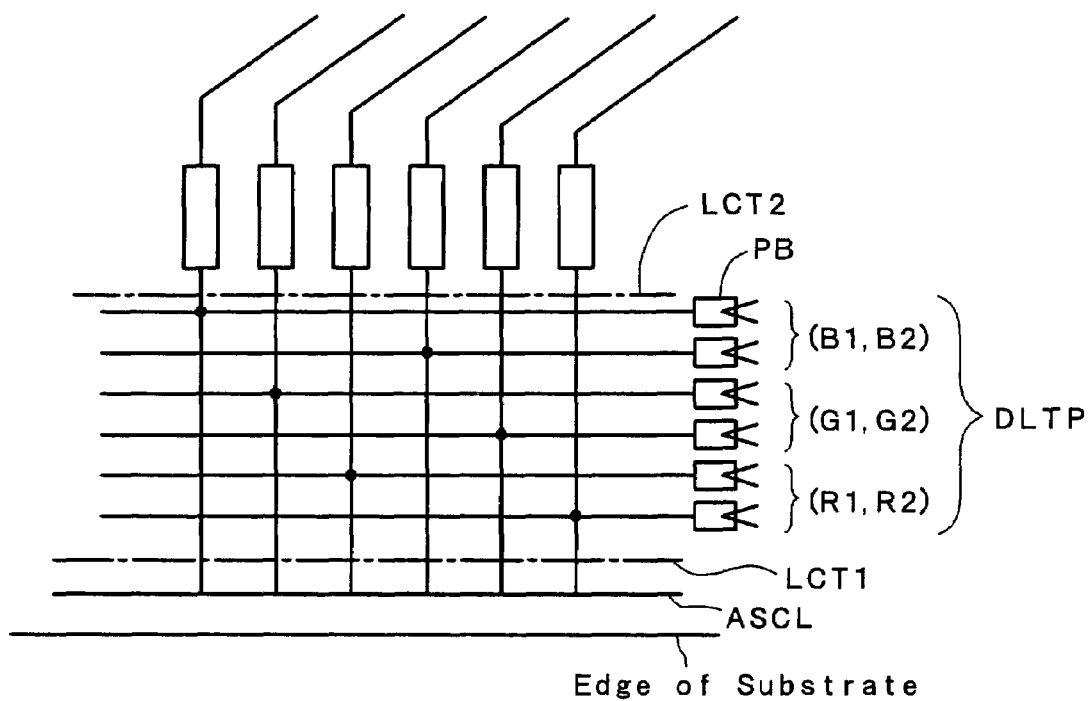
FIGS. 18(a) and 18(b) are diagrams of a lead wiring pattern at a main part of one embodiment of the liquid crystal display device in accordance with the invention.
Figure 18:
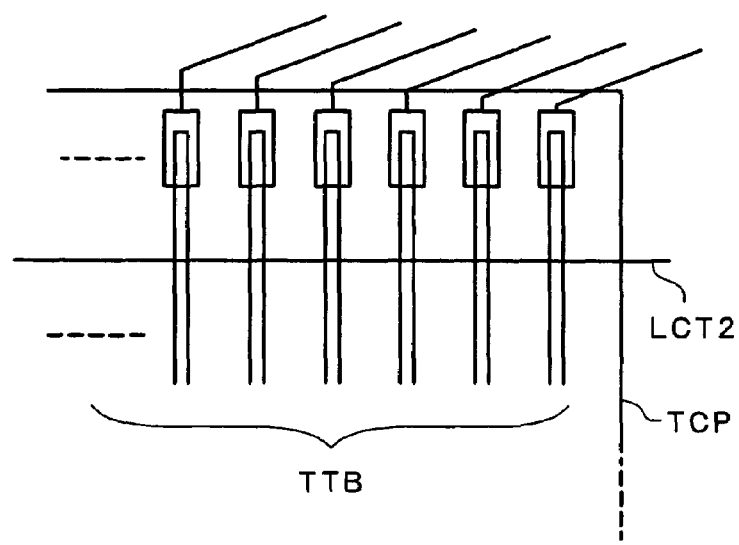

Although the above explanation concerns the scan signal line side, an arrangement as to the video signal line side is shown in FIGS. 18(a) and 18(b), wherein the former corresponds to FIG. 17(a), whereas the latter corresponds to FIG. 17(b). Basic processes and ideas are the same as those discussed above In addition, as apparent from viewing FIG. 17(a) or FIG. 18(b), with the TCP scheme, in the state that a liquid crystal display device is completed, it is designable so that the arrangement for inspection based on the schemes and ideas of the present invention as disclosed herein does not reside even where these are applied thereto. However, this invention is inherently directed at provision of a liquid crystal display device based on the above techniques, or, alternatively, to manufacturing methodology of such liquid crystal display device based on the above schemes; and, without "residence or retention" as a hardware structure in final products, any available TCP scheme liquid crystal display devices that are manufactured while incorporating the techniques or ideas of the invention as disclosed herein should be considered to fall within the scope and coverage of the present invention.

Additionally, although an explanation was made with reference to the TCP scheme as an example in FIGS. 17(a) to 18(b), an FCA scheme is substantially the same as the TCP scheme, except that the former is different from the latter in that the substrate separation or "cutaway" process at LCT1 or LCT2 employs either one of laser light and etching in place of the physical cut technique. Note here that in the case of the FCA scheme, there is a difference in that judgment as to whether the liquid crystal display device of interest was manufactured by using the techniques and ideas of the invention as disclosed herein is relatively easy because of the fact that at least part of the common lines is left at part of its substrate even after completion of such liquid crystal display device.

A test pad layout method will next be set forth in conjunction with an example having three common lines on the FCA scan signal line draw-out side. In the TCP case, the basic ideas remain identical. Additionally, the same ideals can be applied even when the common lines used become different in number.

Figure 19:
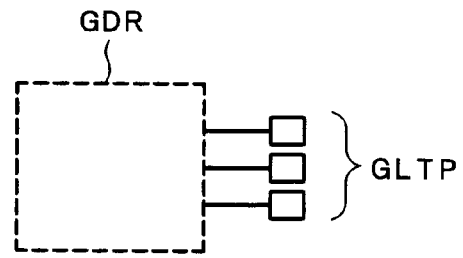
FIGS. 19(a) to 19(d) are diagrams showing pictorial views of a test pad layout pattern of one embodiment of the liquid crystal display device in accordance with the invention.
Figure 19:
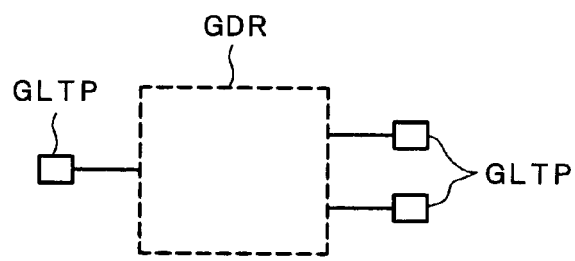
Figure 19:
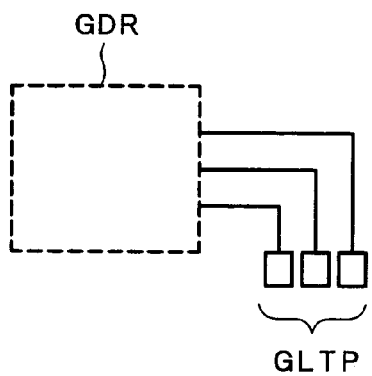
Figure 19:
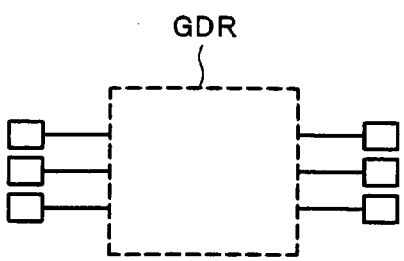

FIG. 19(a) shows an example in which gate driver side test pads GLTP are provided on one side of a single chip GDR, or are alternatively provided in a certain region with an ensemble of terminals laid out therein if in the TCP case, wherein manufacturing of probes PB is made easier. Next, FIG. 19(b) shows an example with an alternate layout, wherein it becomes possible to provide an arrangement for enlarging test pads GLTP on a per-pad basis, which in turn makes it possible to facilitate position alignment of probes PB while at the same time reducing the test/inspection time period required. FIG. 19(c) shows an example with the test pads GLTP provided in a different region from the scan line side common line draw-out region. With such an arrangement, design flexibilities in both layout and size increases. FIG. 19(d) shows an example with the test pads provided on both sides. With this arrangement, it is possible to suppress unwanted waveform rounding of test signals as supplied from scan-line side common lines toward a scan line, thereby permitting achievement is of tests closer to real drive states.

Figure 20:
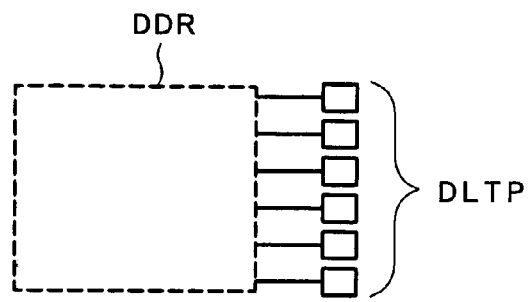
FIGS. 20(a) to 20(d) are diagrams showing pictorial views of a test pad layout pattern of one embodiment of the liquid crystal display device in accordance with the invention.
Figure 20:
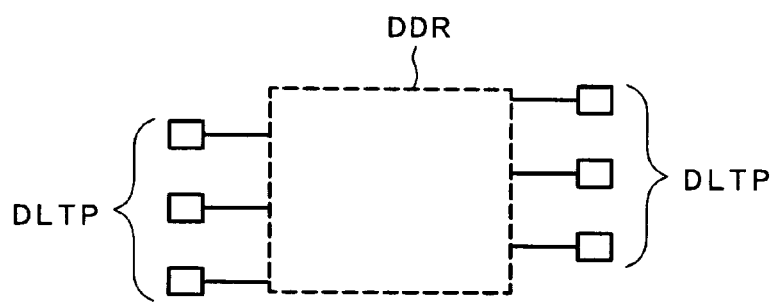
Figure 20:
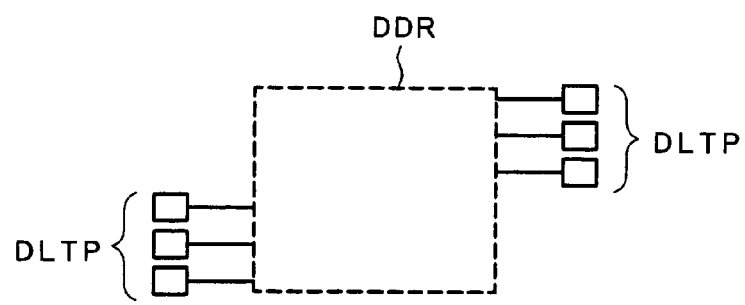
Figure 20:
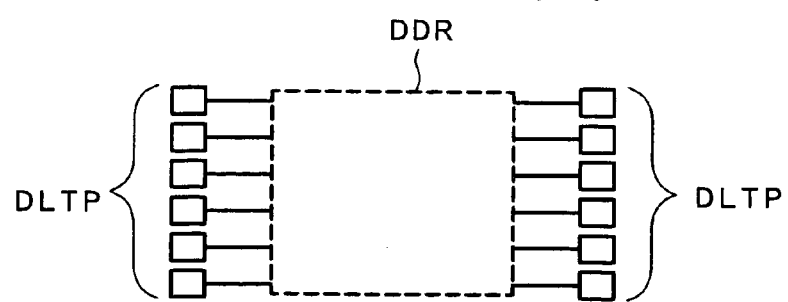

The video signal draw-out side is the same in concept as the scan signal line drawout side. Several example of the case of using six signal line side common lines are shown in FIGS. 20(a) to 20(d). FIG. 20(a) shows an example with the test pads PB arranged on one side. FIG. 20(b) shows an example with an alternate draw-out on the opposite sides. An increase in the number of probes PB results in an increase in position alignment accuracy due to enlargement of the size of GLTPs when compared to the case of FIGS. 19(a) and 19(b). FIG. 20(c) shows an example with GLTPs arranged in units of positive and negative polarities. FIG. 20(d) shows an example with a both-side arrangement.

Several examples of the GLTP layout in a multiple chip mount region, if in the FCA case, or in a region spanning a plurality of regions each including an ensemble of terminals, if in the TCP case, will next be explained, with a scan line side region in FCA being used as an example, along with some examples thereof. Obviously, the same ideas are applicable in case the common lines are different in number and to the drain side also, and the following explanation is devoted to mere examples thereof.

Figure 21:
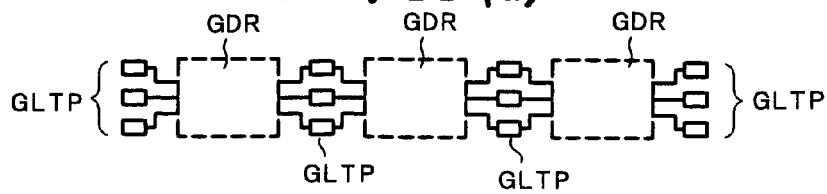
FIGS. 21(a) to 21(f) are diagrams showing pictorial views of a test pad layout pattern of one embodiment of the liquid crystal display device in accordance with the invention.
Figure 21:
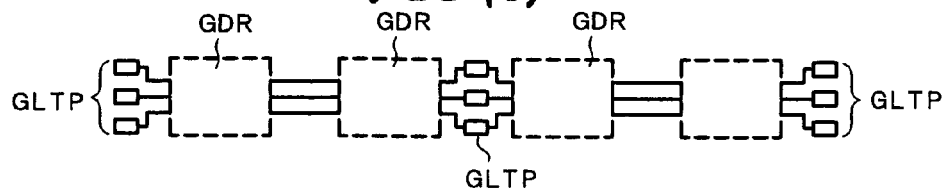
Figure 21:
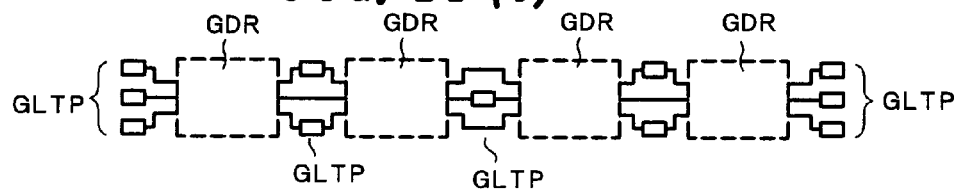
Figure 21:
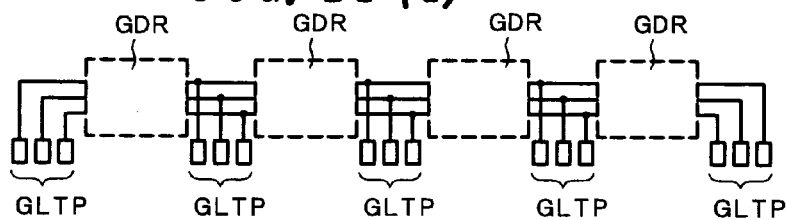
Figure 21:
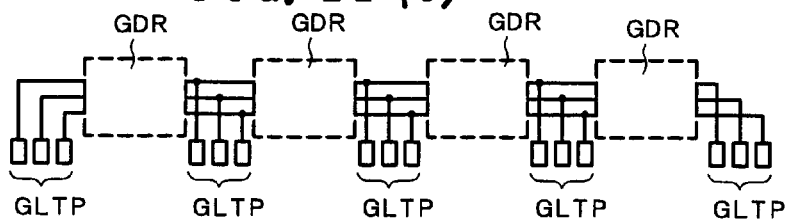
Figure 21:
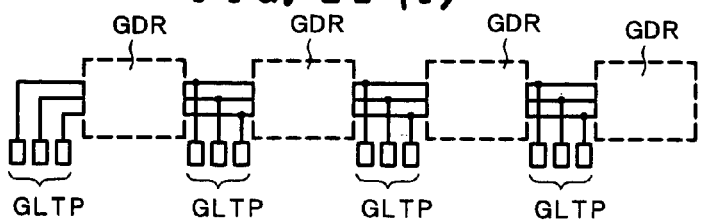

FIG. 21(a) shows an example in which gate driver side test pads GLTP are laid out on the opposite sides of each scan drive IC mount region GDR. In this case, it is possible to minimize the power-feed-resistivity, thus enabling achievement of tests closer to real drive states. FIG. 21(b) shows an example with GLTPs provided in units of groups each including a plurality of GDRs. In this case the requisite number of probes may be reduced resulting in a decrease in probe production costs. FIG. 21(c) shows an example in which GLTPs are provided alternately with respect to a plurality of signal line side common lines between adjacent ones of multiple GDRS. In this case it is possible to reduce probe costs and also increase the area of GLTP per single one. FIG. 21(d) shows an example with GLTPs formed in a region outside a signal line side common line formation region. In this case, it becomes possible to increase design flexibilities while simultaneously facilitating probe position alignment. Additionally, with this arrangement, it becomes possible, by specifically designing GLTPs in such a manner as to have identical pitches with respect to one edge face on a substrate, to commonly use probes among a variety of types of products with different terminal layout pitches, thus enabling reduction in the number of test/inspection equipment and also reduction in probe costs. FIG. 21(e) shows an example with modification in the railing pattern of leads from GDR's signal line side common lines at one end to GLTPS. In the arrangement of FIG. 21(d), only a single one nearest to an edge will be reversed from the other portions in layout of terminals within GLTPS. Use of the arrangement of FIG. 21(e) avoids this risk, which will be advantageous especially for achievement of probes applicable to multi-type products. Alternatively, a case in which GLTPs per se are eliminated at portions reversed from the other portions in FIG. 21(d) is shown in FIG. 21(f). In this case, similar results to FIG. 21(e) are obtainable, while permitting probe number reduction; unfortunately, the resultant signal power feed is from one-side only f or the GDRs so that it suffers from a problem that pixel regions pertaining to the GDRs become relatively lower in accuracy, in particular as to flicker, than the remaining regions.

Next, further examples and concepts will be described below in conjunction with the drains by way of example.

Figure 22:
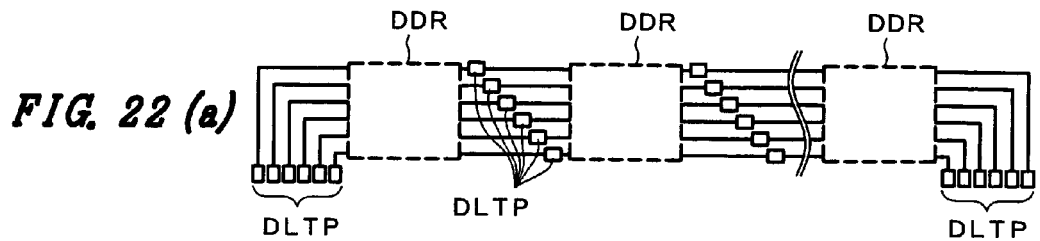
FIGS. 22(a) to 22(f) are diagrams showing pictorial views of a test pad layout pattern of one embodiment of the liquid crystal display device in accordance with the invention.
Figure 22:
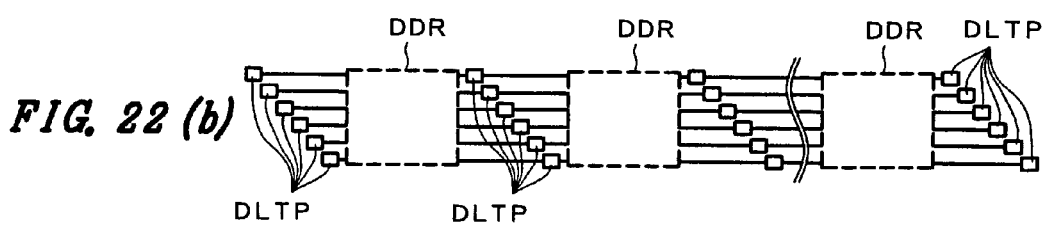
Figure 22:
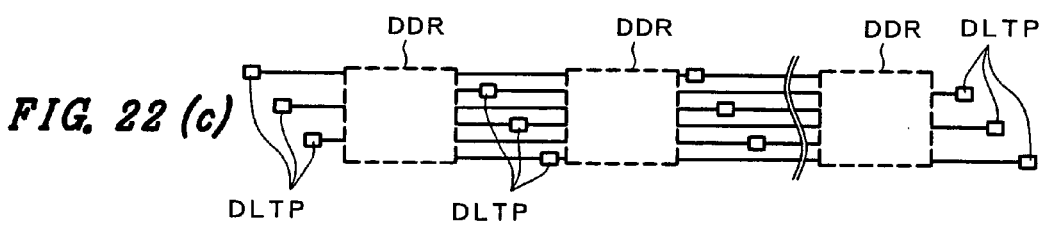
Figure 22:
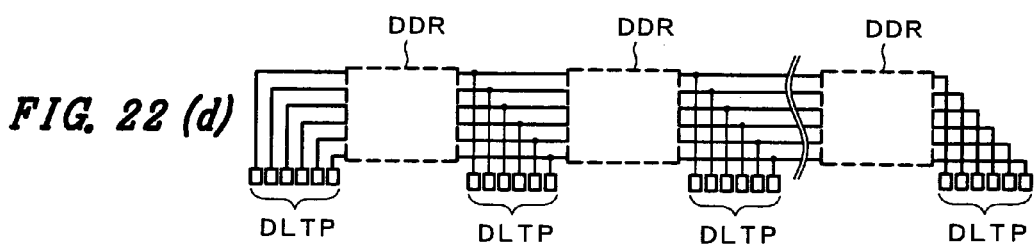
Figure 22:
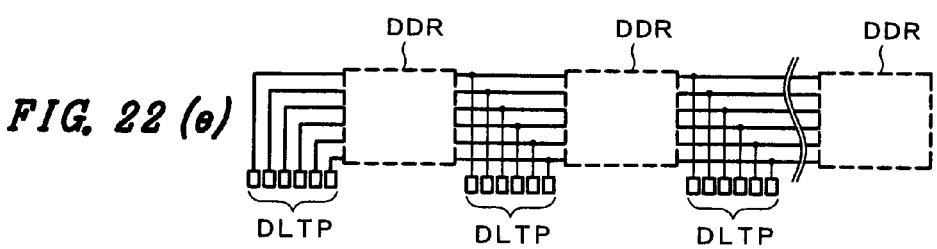
Figure 22:
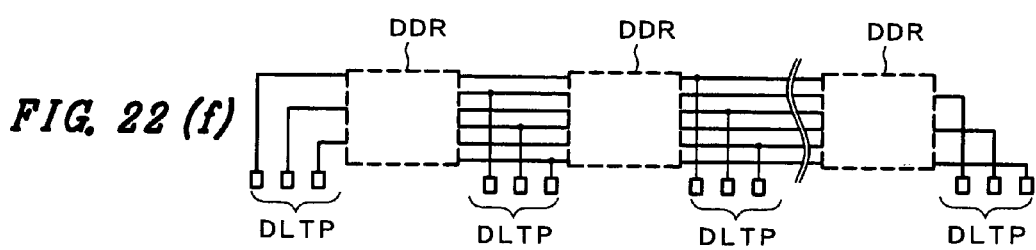

FIG. 22(a) shows an example of drain driver side test pads for signal drive IC mount regions DDR. DLTPs are disposed so that they are shifted in position between DDRS. With such an arrangement, it becomes possible to enlarge the area of each test pad DLTP, thus making easier positioning of the probes PB. FIG. 22(b) shows an example that employs a similar layout for DLTPs on an edge face. In this case, a probe unit may be constituted from a plurality of probes of the same arrangement, thus enabling reduction of probe production costs. FIG. 22(c) is an arrangement similar to that of FIG. 22(b) with a feature added thereto of alternately arranging DLTPs in units of signal line side common lines. With this example, it is possible to enlarge DLTP per single one. Especially, the drain side is greater in line number than the gate side, and its increased amount is greater than that of the aspect ratio of a liquid crystal display device; thus, the distance or interval between chips on the drain side becomes narrower than that of the gate side. Thus, it becomes difficult in some cases to provide sufficient surface areas used f or DLTP formation. Even in such case, use of the arrangement of FIG. 22(c) makes it possible to attain the intended DLTP layout. FIG. 22(d) is the one incorporating the same ideas as those of FIG. 21(d), wherein DLTPs are formed in a region that is out of the scan line side common line formation region. An arrangement for removal of DLTPs on the edge face based on the same concepts as FIG. 21 (f) is shown in FIG. 22(e). The arrangement of FIG. 22(f) is based on the same concepts as FIG. 21(e).

Flicker inspection accuracy is variable depending upon the influence of a very small voltage difference between pixels; thus, it is necessary to control any possible delays of signal waveforms during inspection. Thus, it is desirable that an increased number of test pads for input of test signals to signal line side common lines be provided with respect to each signal line, which number is given as (n−1)/2 or more, where "n" is the number of pads per unit region, which may be a chip mount region or alternatively a region with an ensemble of signal wiring leads provided therein. In addition, to suppress probe cost increases, it is desirable that the pad number be set at 2×(n+1) or less The respective types of examples stated above are the ones that are disclosed, while incorporating this concept also.

It is also desirable that the number of test signal terminals for inputting test signals to scan signal lines is greater than the number of test signal terminals for input of test signals to video signal lines. This is based on a requirement for reducing the input resistivities of the video signal line side while taking account of the fact that execution of the intended test/inspection with the above-noted arrangements requires that the input frequencies of certain test signals to be applied to the video signal lines during inspection be higher than or equal to input frequencies of test signals being applied to the scan signal lines.

In addition, advantages as to lower resistivities are obtainable by providing a region formed of a specific wiring layer with the lowest resistivity in the liquid crystal display device at any one of those wiring leads associated with the signal line side common lines or alternatively between the signal line side and test pads and leads associated with the scan line side common lines or between the scan line side common lines and test pads.

An example for further reduction of the test pad number will be set forth next. Although the gate side will be explained as an example, the same concepts are also applicable to the drain side-additionally, the same concepts are applicable even with TCP. As a representative of these, the gate side of FCA wall be explained as one example.

Figure 23:
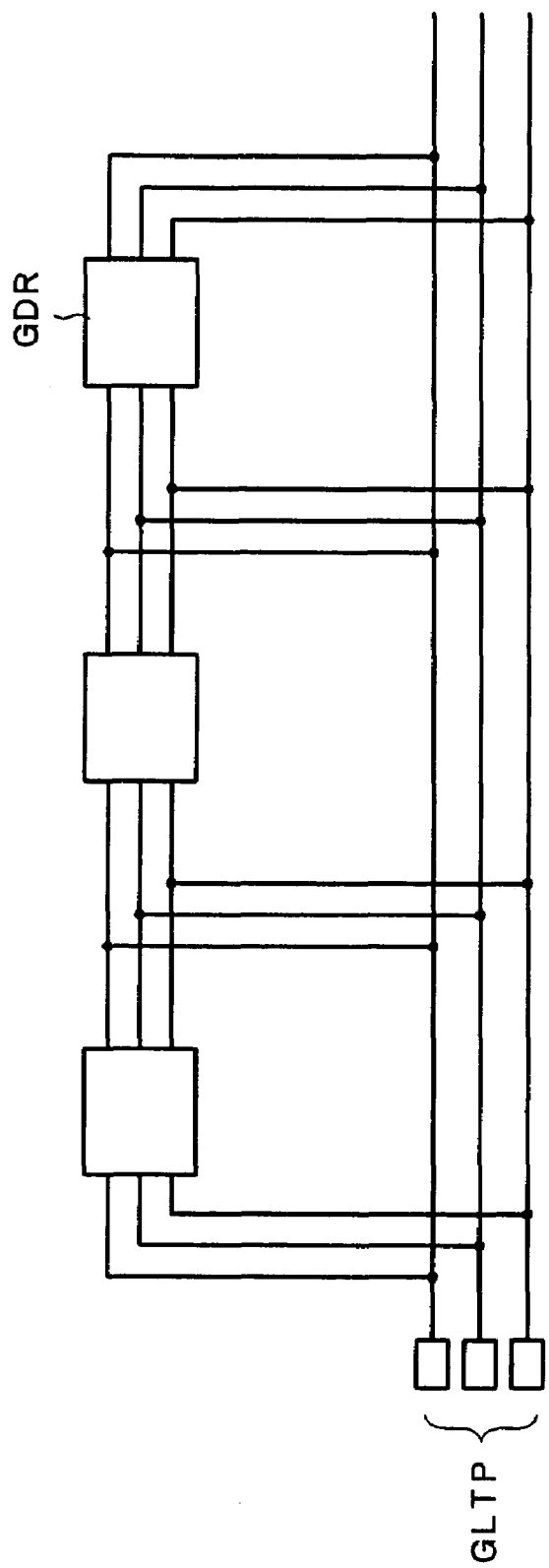
FIG. 23 is a diagram showing a pictorial view of a test pad layout pattern of one embodiment of the liquid crystal display device in accordance with the invention.

FIG. 23 shows an example wherein wiring leads that are drawn out of more than one signal line side common line are provided causing a respective one of such draw-out wiring leads to be connected to a different common line with GLTPs arranged at least at selected ends thereof. With such an arrangement, it becomes possible to reduce the requisite number of GLTPs to the extent that it is equal to the number of scan line side common lines if on the gate side or to the number of signal line side common lines if on the drain side.

Thus, it is possible to noticeably reduce probe production costs while at the same time shortening a test time period due to an ability to facilitate the position alignment of probes used.

However, it is inevitable for this arrangement that a waveform delay occurring due to influence of electrical lead resistivities is degraded when compared to the case of prove ding a great number of GLTPS. To suppress such influence, it is desirable that the different common line be designed to at least partly have a layer of specific material of the lowest resistivity among parts in the liquid crystal display device or alternatively a layer of the same material with its resistivity made lower than within-the-pixel leads by widening the line width thereof.

Next, a scheme will be described for efficiently performing cutting along line LCT1, and, in particular, with respect to an arrangement that is capable of efficiently performing such a process by use of a laser beam, along with one example thereof.

Figure 24:
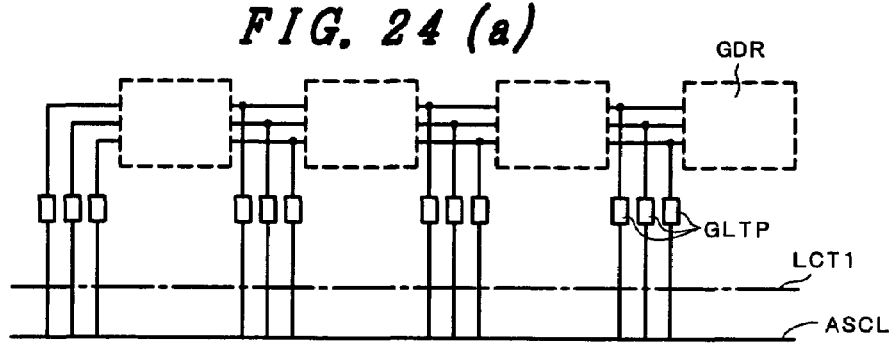
FIGS. 24(a) to 24(d) are diagrams showing pictorial views of a test pad layout pattern of one embodiment of the liquid crystal display device in accordance with the invention.
Figure 24:
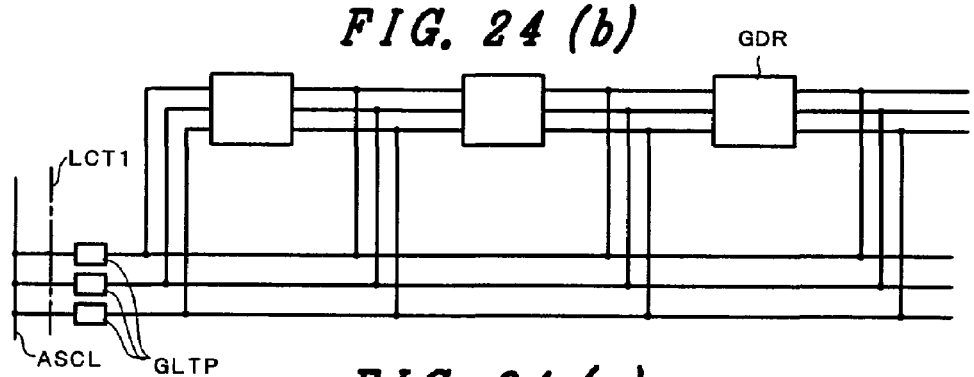
Figure 24:
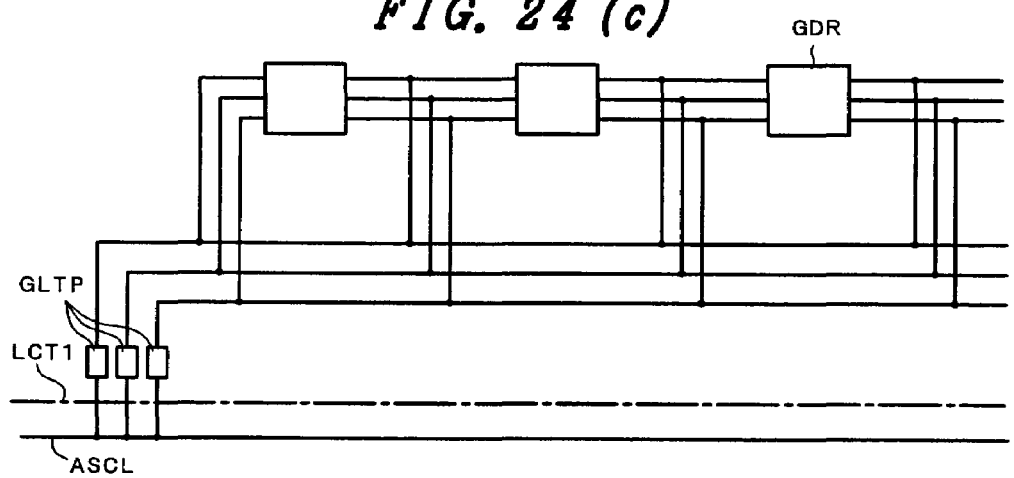
Figure 24:
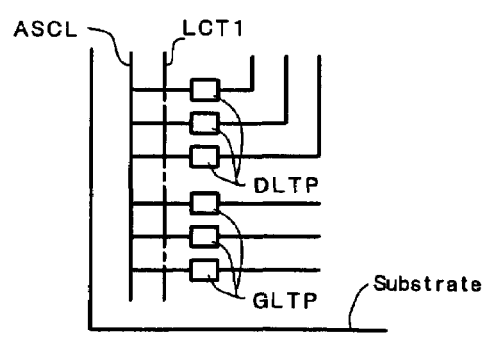

FIG. 24(a) shows the state before the embodiment of FIG. 21(f) is cut along line LCT1, i.e. the test pads are connected to ASCL. Separation using a laser beam is ordinarily performed in a way such that an optical system of the laser beam is fixed while allowing the substrate the move. This is because of the fact that, while the optical system associated with the laser beam is precise, so that deviation can take place in the optical system when it is moved frequently, causing an optical axis of the laser light to be likewise deviated or offset can result in accidental cutaway of portions other than a specified region. In addition, repair in such a case is also precise and thus requires a lengthened time period; and, in view of this, the laser beam is fixed while allowing the substrate to move. In this case, the time taken for separation may be shortened if an increased clearance is present between the region to be cut and the region that must not be cut. This is so because movement is carried out by mechanical mechanisms, and so, in case the substrate is moved more quickly, the resultant offset due to such movement tends to likewise increase. Then, forming the LCT1 region outside a chip region makes it possible to expand the clearance region; thus, it is possible to shorten the time required for separation using laser light accordingly, thereby enabling improvement of throughputs and yields plus costs. Further, forming a cut region linearly permits achievement of higher speed performance.

FIG. 24(b) shows an example with the GLTP number reduced as in FIG. 23 and with LCT1 provided at its distal end part. It is possible to reduce the length of the region to be cut, thus enabling a significant decrease in the processing time period. FIG. 24(c) is another example different in GLTP position from that of FIG. 24(b). FIG. 24(d) is a further example of application the concept of FIG. 23 to both the scan line side and the gate line side, while designing GLTP and DLTP so that they are disposed concentrically. With such an arrangement, a further time reduction is possible. Especially, in the case of a concentrated layout at an edge portion of the substrate, the intended LCT1 separation may be achieved only by a one dimensional cutting process with the substrate as a whole; thus, positional alignment of the substrate for laser cutting is completed through a single trial, thereby shortening the time required. Additionally, the arrangement with test pads concentrated along one side in the way discussed above offers many advantages including the ability to readily realize production of probes for common use with multiple products, as shown in FIG. 2, and to make probe positioning easier.

Next, concepts and examples concerning signal waveforms during the test procedure will be shown. FIGS. 25(a) to 25(c) show an example in a case where the signal line side common lines on the drain side are formed of three lines for the three primary colors RGB, respectively, whereas the scan line side common lines consist of two lines. An explanation will be given using a dot inversion drive as an example. FIG. 25(a) shows the concept of the drive waveform; while, FIGS. 25(b) and 25(c) show certain pixel polarities relative to a reference voltage potential Vcom, which pixels correspond to six adjacent cells as constituted from RGBs and first and second scan lines in first and second frames at this time.

As apparent from comparing FIGS. 25(b) and 25(c), with this arrangement, voltage potentials of the same polarity are always applied to the pixels, resulting in degradation of liquid crystals.

Test waveforms remedying this are shown in FIG. 26(a). As shown in FIG. 26(a), the frequency of a signal as input to a video signal line is ½ of that of FIG. 25(a). Whereby, it is possible to invert the pixel polarity between the first and second frames as shown in FIGS. 26(b) and 26(c), thus making it possible to prevent DC components from mixing into the liquid crystals.

FIGS. 27(a) to 27(c) are directed to a case in which two lines of positive and negative polarities are formed in units of RGBs as the signal line side common lines on the drain side, resulting in provision of six lines in total.

With this arrangement, it is possible to realize a standard dot inversion drive state wherein the voltage potentials of the pixels in the first and second frames, as shown in FIGS. 27(b) and 27(c), are mutually inverted in units of frames, while at the same time causing inversion between neighboring pixels in any event. Thus, it is possible to carry out flicker inspection with high accuracy near real in use states.

FIGS. 28(a) to 28(c) are directed to one example of the case of common inversion. In this case, use of three signal line side common lines for RGB respectively and two scan line side common lines results in realization of a line inversion drive scheme, the first frame and second frame of which are shown in FIGS. 28(b) and 28(c), respectively. Accordingly, in the case of common inversion, employing three signal line side common lines and two scan line side common lines makes it possible to realize flicker tests with higher accuracies near real use states.

FIGS. 29(a) to 29(c) are directed to is an example in which the scan line side common lines consist of three lines in the arrangement of FIGS. 27(a) to 27(c).

In this case, driving is attainable by three lines at the front, self and rear states, as stated previously in the explanation concerning Cadd; and, thus, it is possible to perform tests while allowing the influence of "jumping" voltages at TFTs to be in a state closer that of the final products. However, this suffers from a disadvantage as to the incapability to provide complete dot inversion due to the fact that GA and GC become the same polarity.

FIGS. 30(a) to 30(c) are directed to another scheme for preventing harmful DC application to pixels of FIGS. 25(a) to 25(c), which offers similar effects to FIGS. 26(a) to 26(c). Additional advantages are as follows: these effects in this arrangement are obtainable by use of a single line for the individual one of RGB; and, if two lines for use as the positive and negative polarities are provided in units of RGBs, then the intended flicker remedy is also realized simultaneously.

With the illustrative arrangement, the frequency of the video signal lines is designed to be earlier than that of FIG. 25(a) as shown in FIG. 30(a), while writing a voltage to a pixel with GA, GB set at "high" level at a timing permitting application of signals of opposite polarities in the first frame and second frame, whereby DC superimposition is precluded, the first and second frames of which are shown in FIGS. 30(a) and 30(c), respectively.

FIG. 31(a) shows a set of test signal waveforms for dot inversion driving that are believed to be the best mode when totally taking into consideration the test accuracies and probe costs plus LCD panel frame plate size reduction, wherein the signal line side common lines on the drain side consist of six lines in total- i.e. three positive polarity lines for respective colors of RGB plus three negative polarity lines therefor. In addition, the scan line side common lines on the gate side consist of four lines for enabling constant retainment of the front, self and rear stages, while also realizing flicker suppression. Drive waveforms are shown in FIG. 31(a), whereby the pixel polarities in the first and second frames become as shown in FIGS. 31(b) and 31(c) respectively, thereby enabling realization of the intended dot inversion, with the polarity inverted between neighboring pixels. Obviously no problems occur even when this is used for common inversion. With a liquid crystal display device having such common lines capable of realizing tests based on these waveforms or the inspection scheme thereof, it is possible to realize a sufficient test or inspection procedure while at the same time achieving higher accuracies with a reduced number of test pads during dot inversion driving. In addition, forming probes into the form adaptable for use with this arrangement makes it possible to apply the same to not only dot inversion but also common inversion, thus enabling provision of test apparatus or equipment with enhanced applicabilities.

As has been explained above, according to the present invention, it is possible to enlarge the width and length plus pitch of test pads being connected to signal line leads of a liquid crystal display device for connection to drain drivers and gate drivers, thereby making easier production of probes used for electrical open-circuit tests and turn-on or "lighting" tests even in the case of using the drivers of high-precision display, while simultaneously improving test 5 accuracies due to an ability to effect accurate contact between the probes and test pads, which in turn makes it possible to provide an improved liquid crystal display device with increased reliability.

What is claimed is:

1. A display device comprising:
   a substrate;
   a display area and a peripheral area being formed on said substrate;
   a plurality of signal lines and a plurality of scan lines arranged in said display area; and six signal line common lines provided in said peripheral area;

wherein each signal line common line of said six signal line common lines is connected every six signal lines in a driver IC mount region;

wherein four scan line common lines are provided in said peripheral area; and wherein each scan line common line of said four scan line common lines is connected every four scan lines.

2. The display device according to claim 1, wherein said scan lines are not electrically connected at said peripheral area.

3. A display device comprising:

a substrate;

a display area and a peripheral area being formed on said substrate;

a plurality of signal lines and a plurality of scan lines arranged in said display area; and six signal line common lines provided in said peripheral area;

wherein each signal line common line of said six signal line common lines is connected every six signal lines in a driver IC mount region;

wherein said six signal line common lines include a first signal line common line, a second signal line common line, a third signal line common lines, a fourth signal line common line, a fifth signal line common line and a sixth signal line common line; and wherein said first signal line common line is connected to signal lines relative to display of a first color, and said second signal line common line is connected to signal lines relative to display of said first color, said third signal line common line is connected to signal lines relative to display of a second color, and said fourth signal line common line is connected to signal lines relative to display of said second color, and said fifth signal line common line is connected to signal lines relative to display of a third color; and said sixth signal line common line is connected to signal lines relative to display of said third color.

4. The display device according to claim 3, wherein a voltage applied to said first signal line common line is reversed in polarity with respect to a voltage applied to said second signal line common line;

wherein a voltage applied to said third signal line common line is reversed in polarity with respect to a voltage applied to said fourth signal line common line; and wherein a voltage applied to said fifth signal line common line is reversed in polarity with respect to a voltage applied to said sixth signal line common line.

5. A display device comprising:

a substrate;

a display area and a peripheral area being formed on said substrate;

a plurality of signal lines and a plurality of scan lines arranged in said display area; and six signal line common lines provided in said peripheral area;

wherein each signal line common line of said six signal line common lines is connected every six signal lines in a driver IC mount region;

wherein first color filters are provided along first signal lines and fourth signal lines, second color filters are provided along second signal lines and fifth signal lines, and third color filters provided alone third signal lines and sixth signal lines;

wherein said six signal line common lines include a first signal line common line, a second signal line common line, a third signal line common line, a fourth signal line common line, a fifth signal line common line and a sixth signal line common line; and wherein said first signal line common line is connected to said first signal lines, said second signal line common line is connected to said fourth signal lines, said third signal line common line is connected to said second signal lines, said fourth signal line common line is connected to said fifth signal lines, said fifth signal line common line is connected to said third signal lines, and said sixth signal line common line is connected to said sixth signal lines.

6. The display device according to claim 5, wherein a voltage applied to said first signal line common line is reversed in polarity with respect to a voltage applied to said second signal line common line;

wherein a voltage applied to said third signal line common line is reversed in polarity with respect to a voltage applied to said fourth signal line common line; and wherein a voltage applied to said fifth signal line common line is reversed in polarity with respect to a voltage applied to said sixth signal line common line.

7. The display device according to claim 6, wherein said signal lines are not electrically connected in said driver IC mount region.

8. The display device according to claim 7, wherein said signal lines are divided by laser cut lines.

9. The display device according to claim 5, wherein said signal lines are not electrically connected in said driver IC mount region.

10. The display device according to claim 9, wherein said signal lines are divided by laser cut line.

* * * * *